ERROR DETECTION IN TELEGRAPH SWITCHING SYSTEMS

Filed Sept. 25, 1959 25 Sheets-Sheet 1

INVENTORS
R. STEENECK
D. J. WALKER
R. H. LEONARD
BY [signature]
ATTORNEY

April 4, 1961 R. STEENECK ET AL 2,978,541

ERROR DETECTION IN TELEGRAPH SWITCHING SYSTEMS

Filed Sept. 25, 1959 25 Sheets-Sheet 5

ERROR DETECTION IN TELEGRAPH SWITCHING SYSTEMS

Filed Sept. 25, 1959 25 Sheets-Sheet 6

April 4, 1961 R. STEENECK ET AL 2,978,541

ERROR DETECTION IN TELEGRAPH SWITCHING SYSTEMS

Filed Sept. 25, 1959

25 Sheets-Sheet 15

April 4, 1961 R. STEENECK ET AL 2,978,541

ERROR DETECTION IN TELEGRAPH SWITCHING SYSTEMS

Filed Sept. 25, 1959 25 Sheets-Sheet 18

United States Patent Office 2,978,541
Patented Apr. 4, 1961

2,978,541

ERROR DETECTION IN TELEGRAPH SWITCHING SYSTEMS

Robert Steeneck, New York, N.Y., and Donald J. Walker, Rutherford, and Robert H. Leonard, Paterson, N.J., assignors to The Western Union Telegraph Company, New York, N.Y., a corporation of New York Filed Sept. 25, 1959, Ser. No. 842,463

18 Claims. (Cl. 178—23)

This invention relates to means for detecting errors in telegraph transmission, by means of perforated tape, through standard telegraph switching equipment, more particularly for producing from a data tape a transmitting tape embodying error check characters for transmission to a receiving telegraph station where errors which may have occurred at or between the transmitting and receiving stations may also be checked. The instant invention relates to a modification of, and certain improvements on, telegraph error detecting systems disclosed in the U.S. application of Robert Steeneck, Serial No. 677,264, filed August 9, 1957, and in the U.S. aplication of Donald J. Walker and Robert H. Leonard, Serial No. 823,387, filed June 29, 1959, both of which cases are assigned to the assignee of the instant case; the disclosures of these cases are incorporated herein by reference.

As in the foregoing applications of Steeneck and Walker et al., the instant system employs a totalizing technique in which either the marking or spacing pulses of the conventional 5-unit permutation code characters commonly used in commercial telegraph systems, preferably the marking pulses, in a line or block of data are totaled on a weighted computational basis. Each code combination comprising a character is accorded a corresponding number since each "level" of the code is assigned a different computational weight or value. The term "level" refers to the relative code position or sequential order of each of the marking and spacing pulses which comprise each character. For example, the first level of a 5-level code may be assigned the value of 1, the second level the value of 2, the third level 4, the fourth level 8, and the fifth level 16. The different values chosen should be such that the sum of the check levels of a message character is never equal to the value represented by any one of the remaining code levels of a character to thereby substantially obviate the probability of compensating errors in a character affecting the accuracy of the checking operation.

The total value of all the code combinations comprising the characters in each line of data is obtained by feeding the different valued marking pulses of each code combination of the message into the corresponding stages of a binary counter, and it has been found feasible to restrict the binary counter to 8 stages, the binary total representing the resultant aggregate value of the weighted marking pulses of the characters of each block of data equals a number which is registered in the "1" side of the stages of the counter and preferably, although not necessarily, the readout is from the "0" sides of the stages of the counter at the transmitting station, which read-out is the complement of the binary total of the block of data. An end-of-line signal, such as a "carriage return," is transmitted at the end of each line of data, and then the first four bits of this complement are transmitted as the first, second, fourth and fifth pulses of a first checking character. The last four bits of this complement are next transmitted as the first, second, fourth and fifth pulses of a second checking character.

The equipment at the sending end comprises a tape transmitter with two sets of reading pins, a reperforator, the 8-stage binary counter, an electronic pulse generator and electronic controls.

It is an object of the instant invention to produce, from a data-bearing control form, for example, a perforated tape manually prepared on a keyboard perforator, a new control form, such as a perforated tape punched on a reperforator, which includes error check information at the end of each line or block of data appearing in the original data tape, which new tape is adapted for transmission of the data and the error check characters to a receiving station.

Another object of the invention is the provision of means to prepare a control form, such as a perforated tape, at the sending station and verify that the sending equipment is functioning properly.

Another object of the invention is to provide an improved error check system which is substantially entirely transistorized thereby to reduce the size and replacement costs and maintenance requirements, and in which all electromagnetic relays have been eliminated so that the speed of operation will be limited only be reperforator or line speeds.

Still another object of the invention is to provide, at a receiving switching station or at a terminal station, means for reperforating a tape in accordance with the incoming signals and marking the final perforated tape in a manner to indicate whether errors have ocurred in the received information.

Another object of the invention is to provide at the receiving switching or terminal station means to verify that the receiving equipment is functioning properly.

An additional object is to provide timer means at the transmitting and receiving ends of the system for checking the length of each block of data in a perforated tape to assure that "end of block" characters have been perforated at the proper places in the tape at the transmitting end that the equipment associated with the reading of such characters is functioning properly.

Other objects and advantages will be apparent from the following detailed description of an illustrative embodiment of the improved error detecting system, taken in connection with the accompanying drawings in which.

Figure 27:
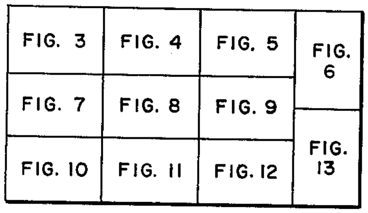
Figure 28:
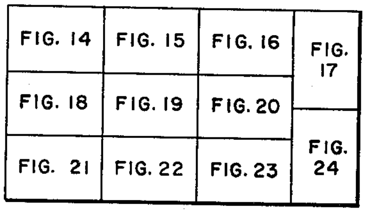
Figure 25:
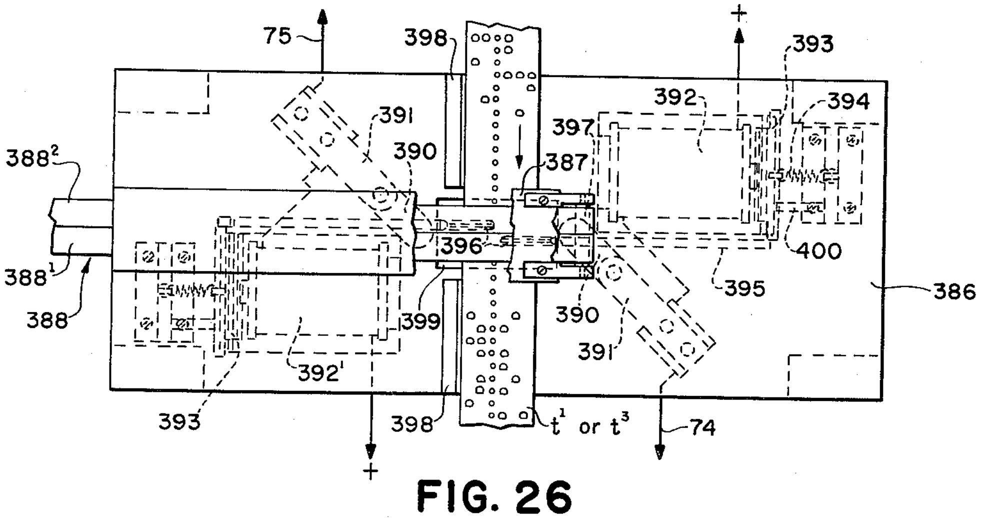
Figure 26:
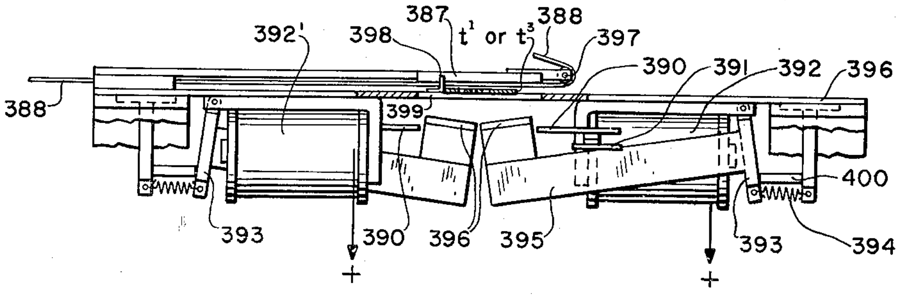

Figs. 3 to 13 collectively comprise a schematic circuit diagram of the error detecting system at the sending end;

Figs. 14 to 24 collectively comprise a schematic circuit diagram of the receiving end of the system;

Figs. 25 and 26 show certain details of a tape marking device employed to indicate whether errors have occurred in the received block of data;

Fig. 27 shows the manner in which Figs. 3 to 13 should be arranged with respect to each other; and Fig. 28 shows the manner in which Figs. 14 to 24 should be arranged with respect to each other.

*General description*

Figure 1:
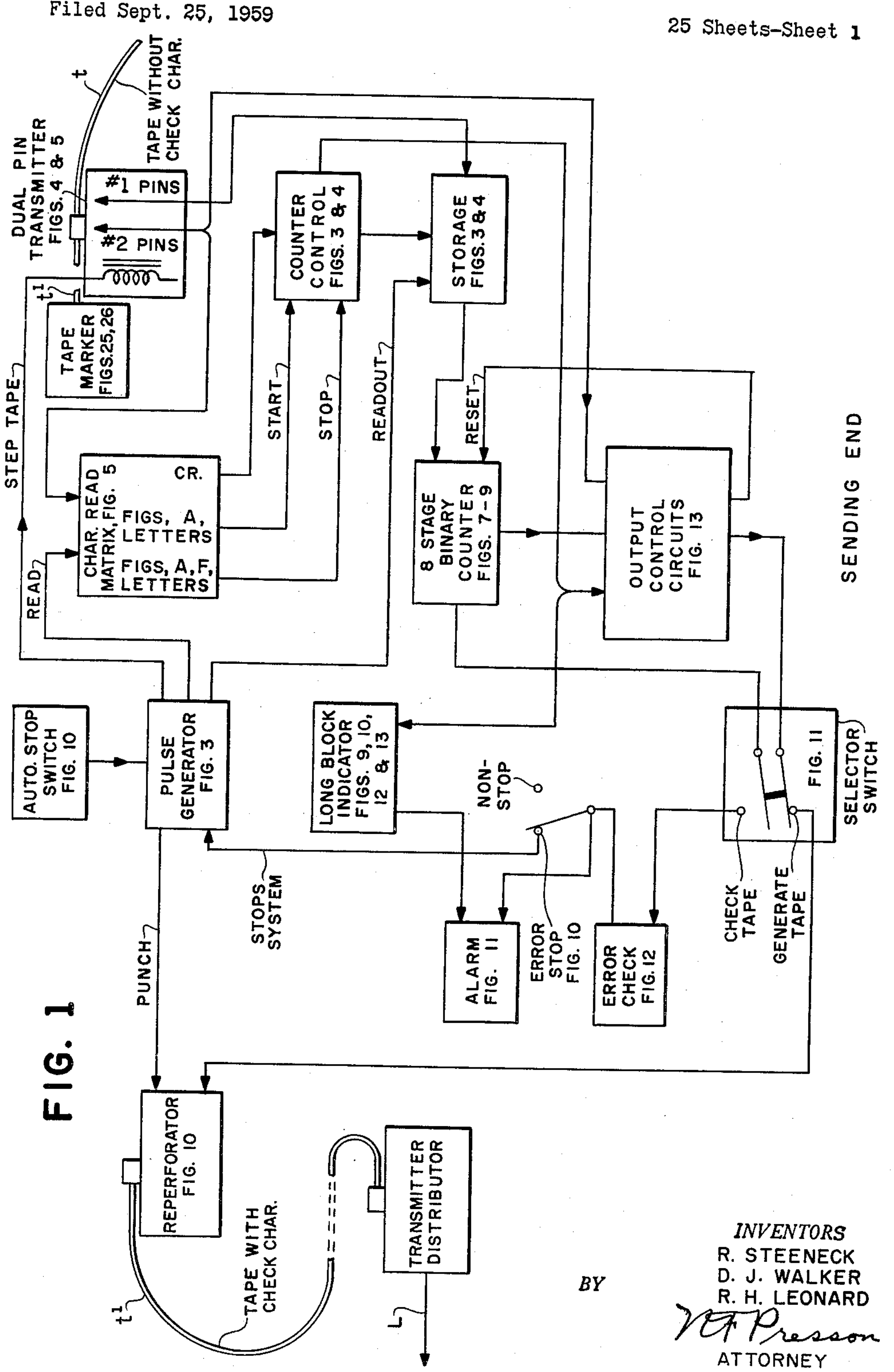
Fig. 1 is a block diagram showing various units embodied in the sending end of the system.

The equipment at the Sending End of the system includes a tape transmitter having dual sets of reading pins, a reperforator, an eight-stage binary counter, an electronic pulse generator, and electronic controls, shown diagrammatically in the block diagram of Fig. 1. A data tape *t* which has been prepared on any suitable perforator, such as a type commonly known in the art as a Type 19 set, is fed on an "off line" basis through the dual pin transmitter shown in the upper right hand corner of Fig. 1. The Sending End equipment is primarily designed to produce from the data tape $t$, which may include data processing information, telegrams, or other message material, a new tape $t^1$ which issues from the reperforator shown at the left hand portion of the figure. The new tape incorporates error check characters at the end of each line of data.

To start this process the Selector Switch is set to the "generate tape" position and the data tape without check characters is fed through the dual pin transmitter which is of a type well known in the art, as disclosed in various patents including the U.S. patents to E. E. Kleinschmidt, No. 2,474,257, issued June 28, 1940, and No. 2,502,013, issued March 28, 1950. The transmitter has two sets of reading pins 0.1" apart which is the distance between characters in the tape, the two sets of pins operating simultaneously. The first set, designated #1 pins, feeds the counter through the counter control unit, and the second set, designated #2 pins, feeds the reperforator through the check character switch and the character reading matrix. Routing information at the beginning of the tape for the control of switching centers is transmitted to the reperforator but is not sent to the counter which is turned off at this time. At the end of the routing information a special three-character code which has been inserted in the data preparation is read indicating the beginning of the data. At this point the counter is turned on automatically and set to "0". The starting 3-character code may comprise any combination of characters which does not conflict with switching operations or with the message information, for example, and as indicated in the block diagram, "Figures shift (Figs), the letter A, and Letters shift (Ltrs)."

The entire first block of data in the tape $t$, which ends with a predetermined character, for example, carriage return, is sent to both the reperforator and the counter. When the carriage return character (CR) is read by the matrix, the tape transmitter is stopped, and the two error check characters are transmitted from the counter to the reperforator and the counter is reset to "0." These error check characters, as hereinbefore stated, preferably represent the complement of the sum in the 8 stages of the counter and are punched as two successive characters in the tape $t^1$. Only four of the five levels in the code of each check character are used, with the third level always made marking, as hereinafter disclosed, to prevent interference with other functional characters such as carriage return, figures or blanks from appearing as a check character. This process is repeated for the next data block beginning with the line feed character (LF) and ending with CR and for succeeding data blocks until the "end of data" group of characters are sensed. Such a group of end-of-data characters may, for example, comprise Figs, A, F, and Ltrs. This combination turns off the computer and allows the message terminating characters to be transmitted only to the reperforator.

By using two sets of reading pins in the transmitter, one set to transmit to the counter and one set to the reperforator, the possibility of reading errors being undetected is practically eliminated. The possibility of both sets of transmitter pins making the same error is extremely small and any difference will be detected in the check at the receiving station. The tape that has been produced by the reperforator contains the check characters of each block of data and may be transmitted by a tape transmitter and distributor, diagrammatically shown at the left hand portion of Fig. 1. If desired, the tape $t^1$ issuing from the reperforator may be fed directly to the sending transmitter for transmission of the signals over the outgoing line $L^1$. Such signals may be transmitted over any conventional switching system or leased circuit.

It has been found desirable, particularly for data processing purposes, to check the tape $t^1$ locally before transmitting it, and to effect this the selector switch is thrown to the "check tape" position which disconnects the reperforator and connects the checking units. The tape $t^1$ is fed through the dual pin transmitter and each block is checked for punching errors at the sending end in a manner which will be described hereinafter in detail with reference to the receiving station. If an error is detected an alarm is sounded and the tape stops until the "reset" switch is operated which silences the alarm and enables checking to continue.

Figure 2:
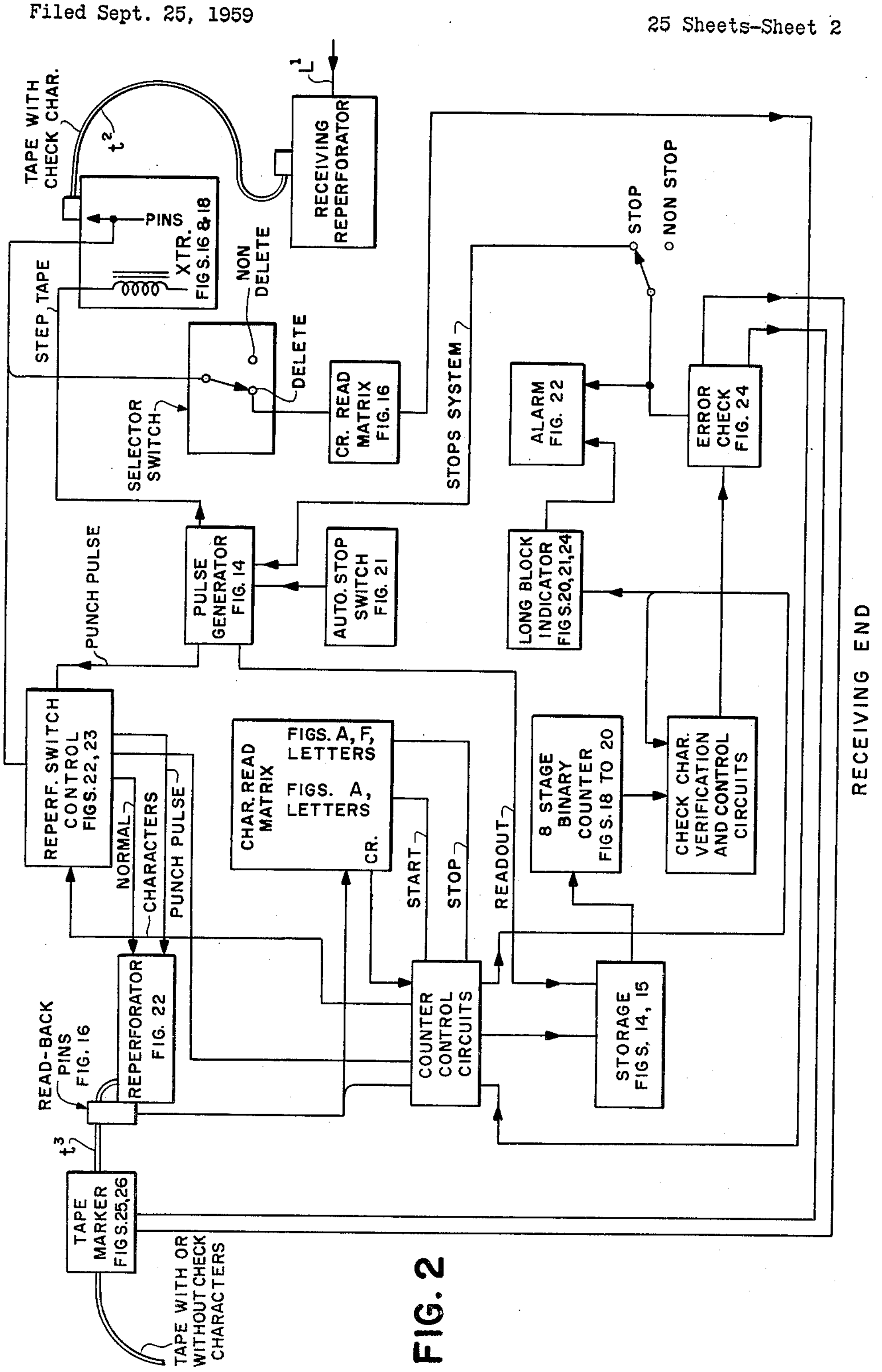
Fig. 2 is a block diagram showing various units embodied in the receiving end of the system.

At the receiving station shown in block diagram form in Fig. 2, the received data tape $t^3$ with the check characters therein is received on a conventional reperforator and is fed through the transmitter in the error checking unit. The transmitter sends to a read-back reperforator through the reperforator control switching unit which is in the "normal" position at this time.

The read-back reperforator is a multi-magnet reperforator for reproducing perforated tape for message relaying purposes in response to code pulses received over multi-wire signal paths from a distributor, in this case five wires since 5-unit code is employed. The reperforator has read pins for sensing the perforated tape and for reading back the message on five signal paths for verification as to accuracy. It perforates and feeds the tape in timed relation with the distributor. Such a reperforator is well known in art, as disclosed in various patents including the U.S. Patent to W. B. Blanton et al., No. 2,575,329, issued November 20, 1951. In practice, the read-back reperforator employed is of the type known in the art as a "Model 28 Multi-Magnet Reperforator" described in Teletype Bulletin No. 2448 of October 1957, published by the Teletype Corporation, Chicago, Illinois. Read-back pins of the reperforator spaced a predetermined number of characters, for example, five characters, after the punch pins, read the final tape and feed the characters to the counter and the character reading matrix. The counter is automatically turned off while the routing information at the beginning of the tape is passing over the read-back pins. When the sequence of characters, "Figs, A, Ltrs" is read by the matrix associated with the reperforator, the counter is turned on and totaling of the characters of the data block begins. The checking process may be done in two different ways depending on whether the selector switch S is in "Delete" or "Non-Delete" position. If it is desired that check characters shall not be punched in the final tape $t^3$, the selector switch is thrown to "Delete" and checking proceeds in the following manner.

The first data block continues to be sent from the transmitter to the reperforator until the matrix associated with the transmitter reads the CR at the end of the block. It should be remembered that the read-back pins on the reperforator are reading the fifth character before the CR because of the spacing of the punch pins and the read-back pins. The reperforator is turned off at this point and code levels 1, 2, 4 and 5 of the two check characters are transmitted only to the counter from the transmitter. The counter control unit directs the four elements of the first character to the first four stages of the eight-stage counter and the four elements of the second check character to the last four stages of the counter. The reperforator is then turned on again and the transmitter starts to send the characters of the second data block starting with line feed and the read-back pins on the reperforator read the remaining characters of the first data block. When the read-back pins read the CR at the end of the first block this is detected by the character reading matrix associated with the reperforator.

After the CR character is read, a check is made to see if all stages of the counter are set to "1" and the counter is reset. If this check is satisfied the block is marked, preferably by a black stripe, by the tape marker and checking of the second block proceeds without interruption. If any counter stage is set to "0" the system is stopped, an alarm is sounded and the errored block of the tape is marked, preferably by a red stripe. The Reset switch must be operated before checking will proceed. However, if the error switch is thrown to Non-Stop, detection of an error will only cause red marking of the block. Checking of succeeding blocks will be continued and no error alarm will be sounded. This checking process proceeds until the character reading matrix associated with the reperforator detects "Figs, A, F, Ltrs" after the check characters at the end of the last data block. The counter is turned off and any further characters in the received tape are punched but not checked.

To safeguard against improper operation of the checking circuitry a "Long Block" indicator is provided to detect the absence of a check cycle within a predetermined maximum block length, usually 72 characters. This condition stops the equipment and sounds an alarm indicating that an end-of-block signal and a check cycle have been missed. Action can then be taken to recheck and if necessary rerun the skipped block. Because a low error rate is anticipated on normal facilities and an inexpensive system was desired, automatic error correction is not provided. When an error is detected the block must be identified and a rerun requested from the sending station.

If the scan of the eight-stage counter shows one or more stages set at "0," the transmitter is stopped, an alarm is sounded, and the errored block is marked with a red stripe or red arrow on the tape at the end of the data block. However, as above stated, it is not necessary to stop the transmitter. If desired, the transmitter may be permitted to run and the tape containing errored and non-errored blocks may be permitted to accumulate. Later, by examining the tape, the errored blocks may be picked up since they are indicated by the red arrow mark.

If it is desired to have the check characters form a part of the data blocks in the final tape, a switch may be thrown from "Delete" to "Non-Delete" position. When this occurs, the checking procedure is the same as outlined above except that the check characters are punched in the final tape by the reperforator and are introduced into the counter from the read-back pins of the reperforator.

*Detailed description of sending apparatus*

Figure 3:
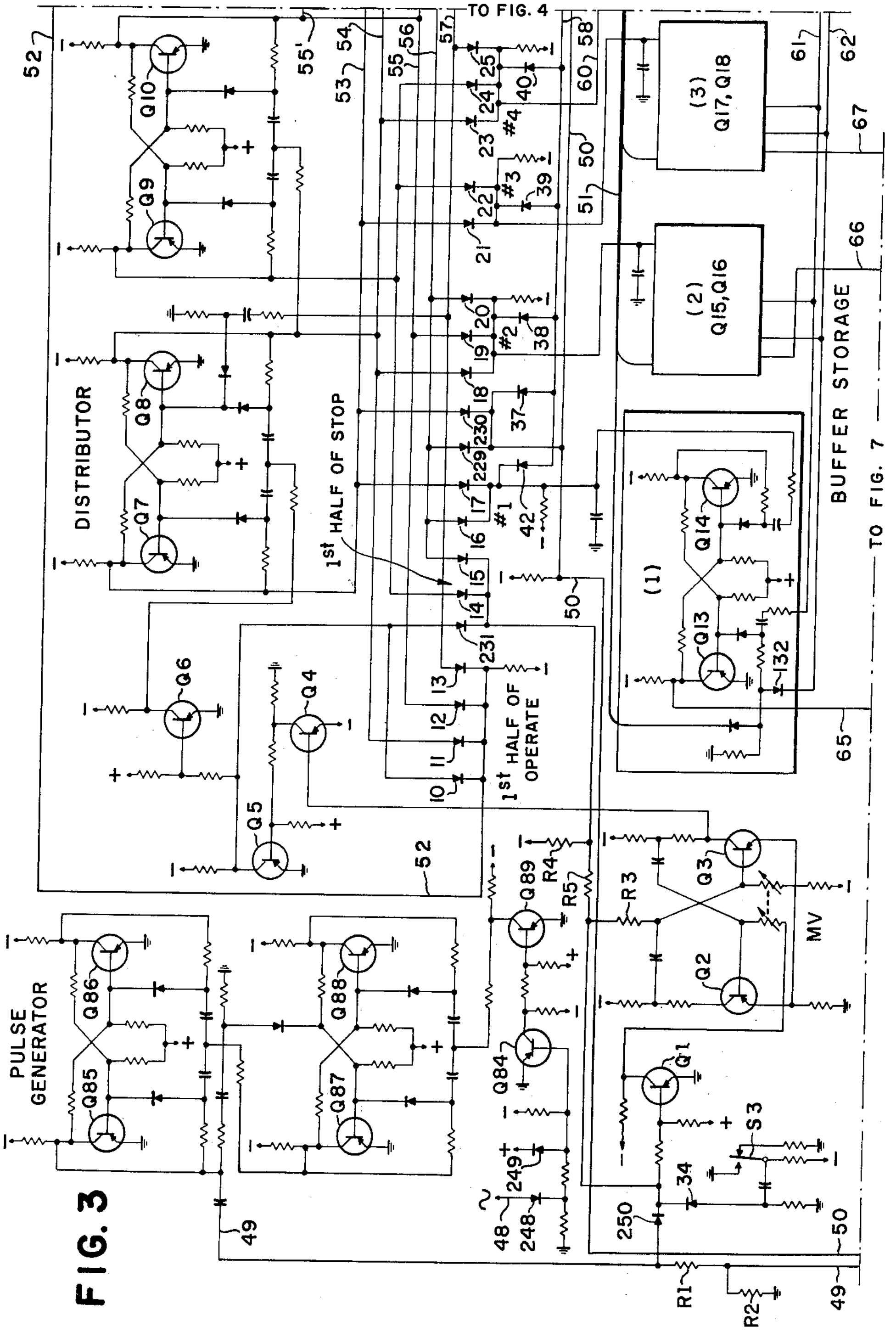
Figure 4:
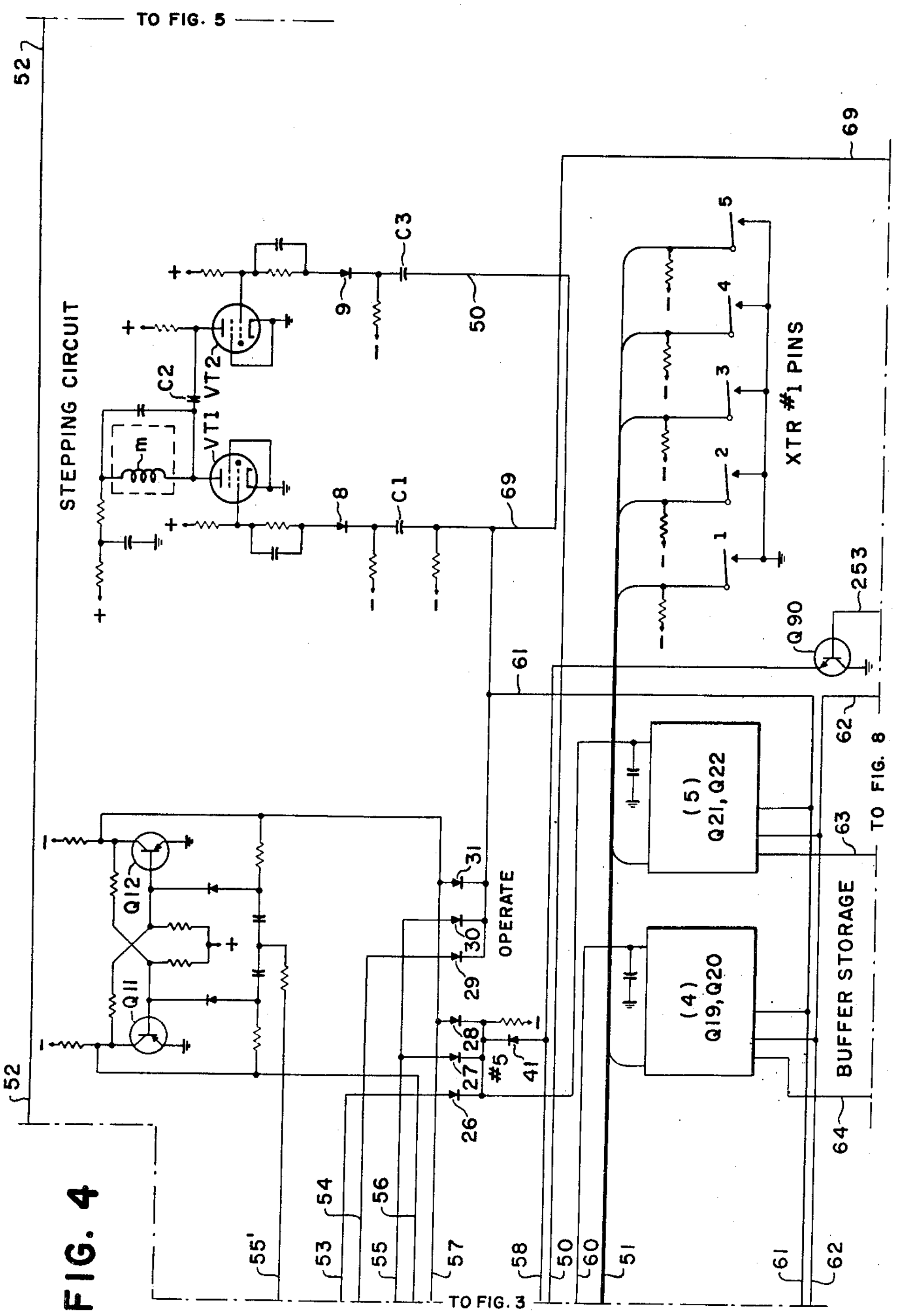
Figure 5:
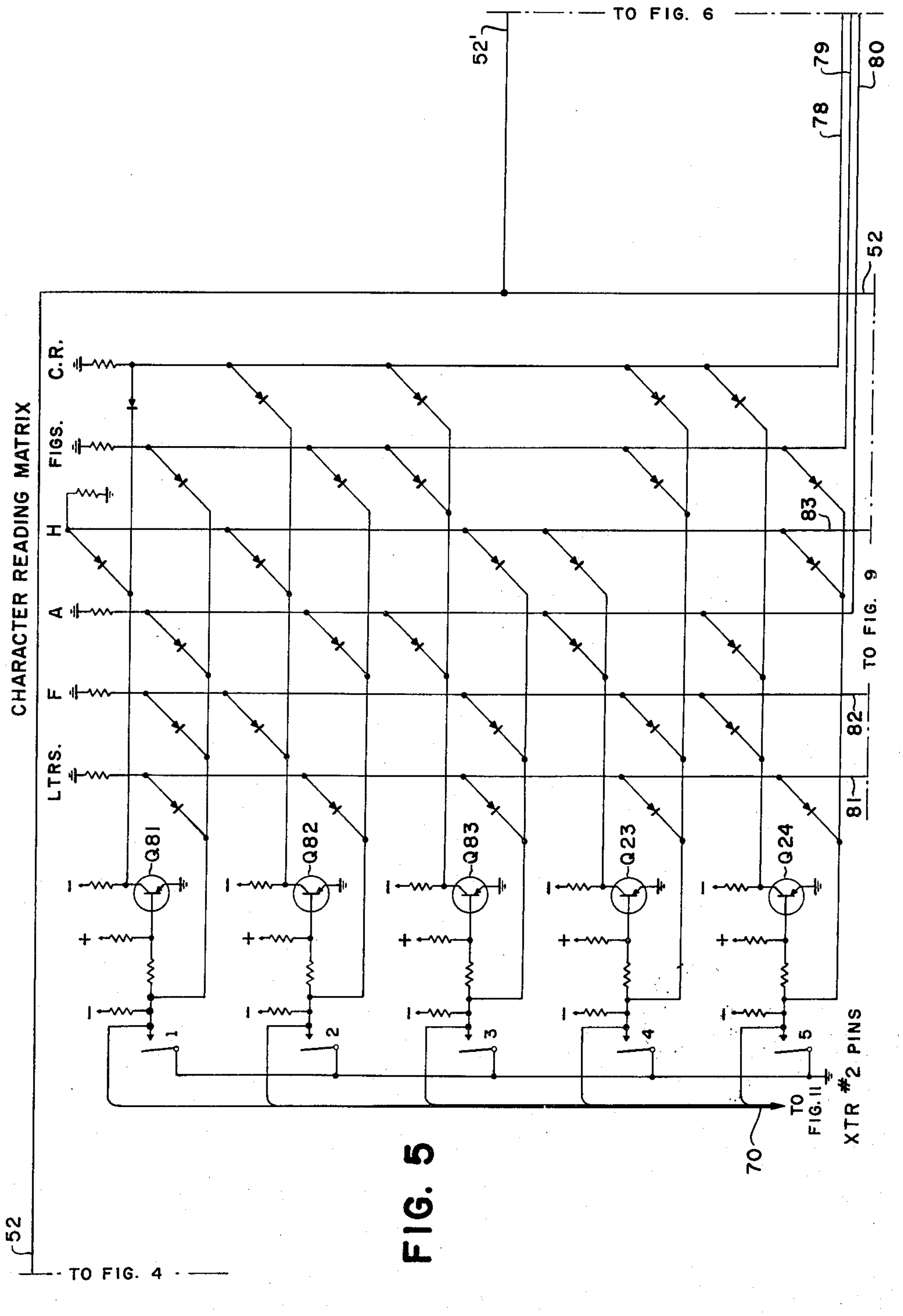
Figure 6:
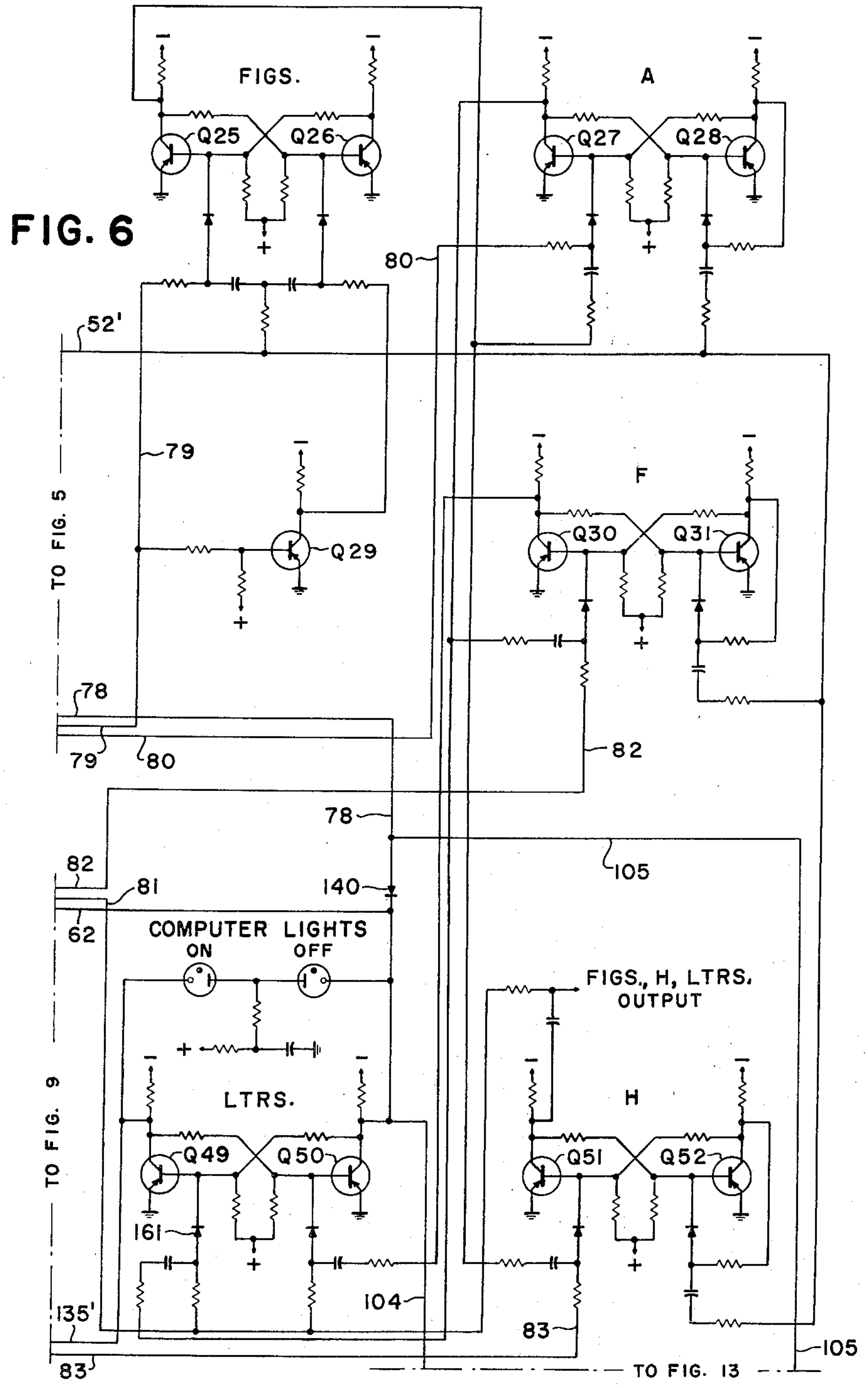
Figure 7:
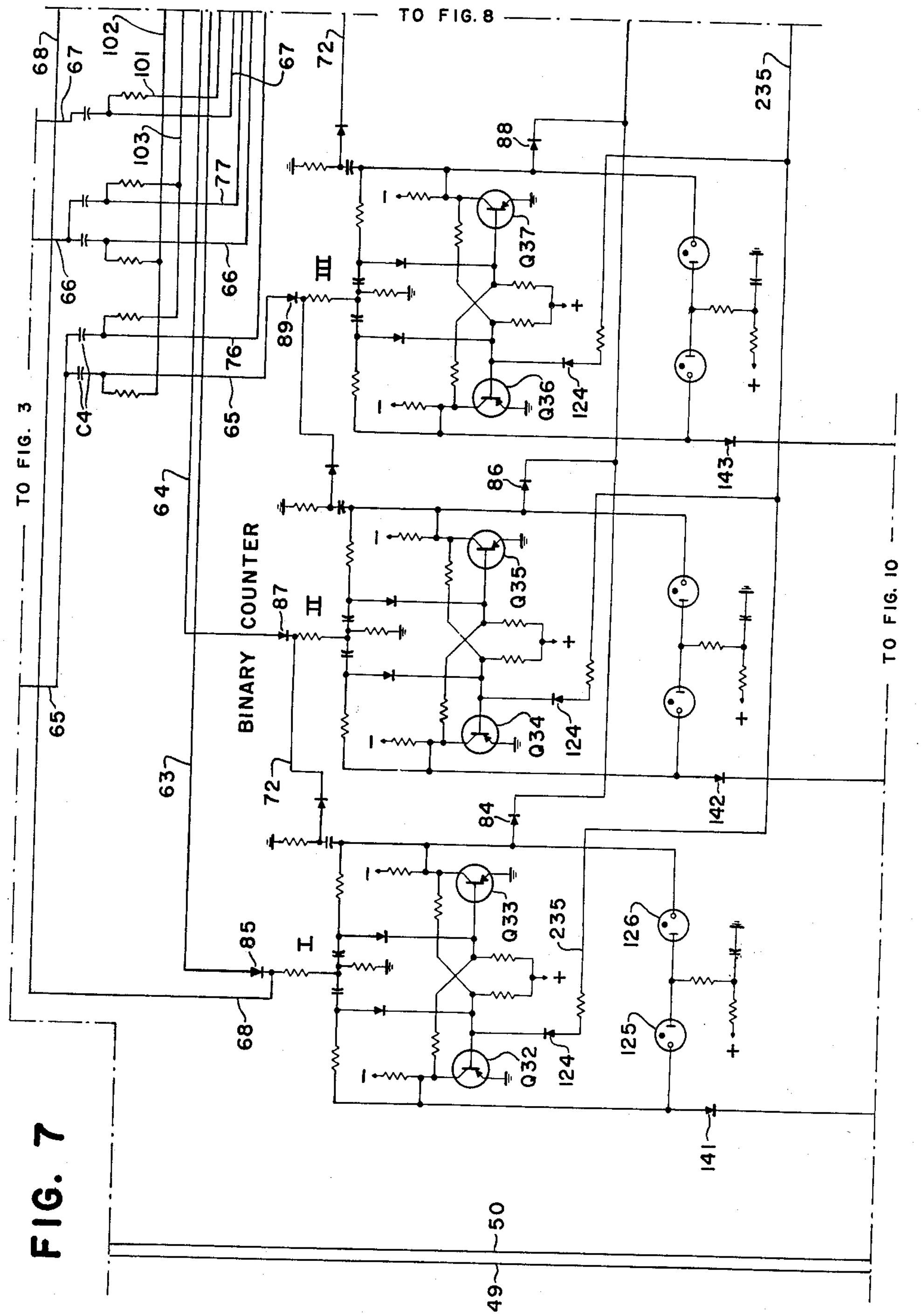
Figure 8:
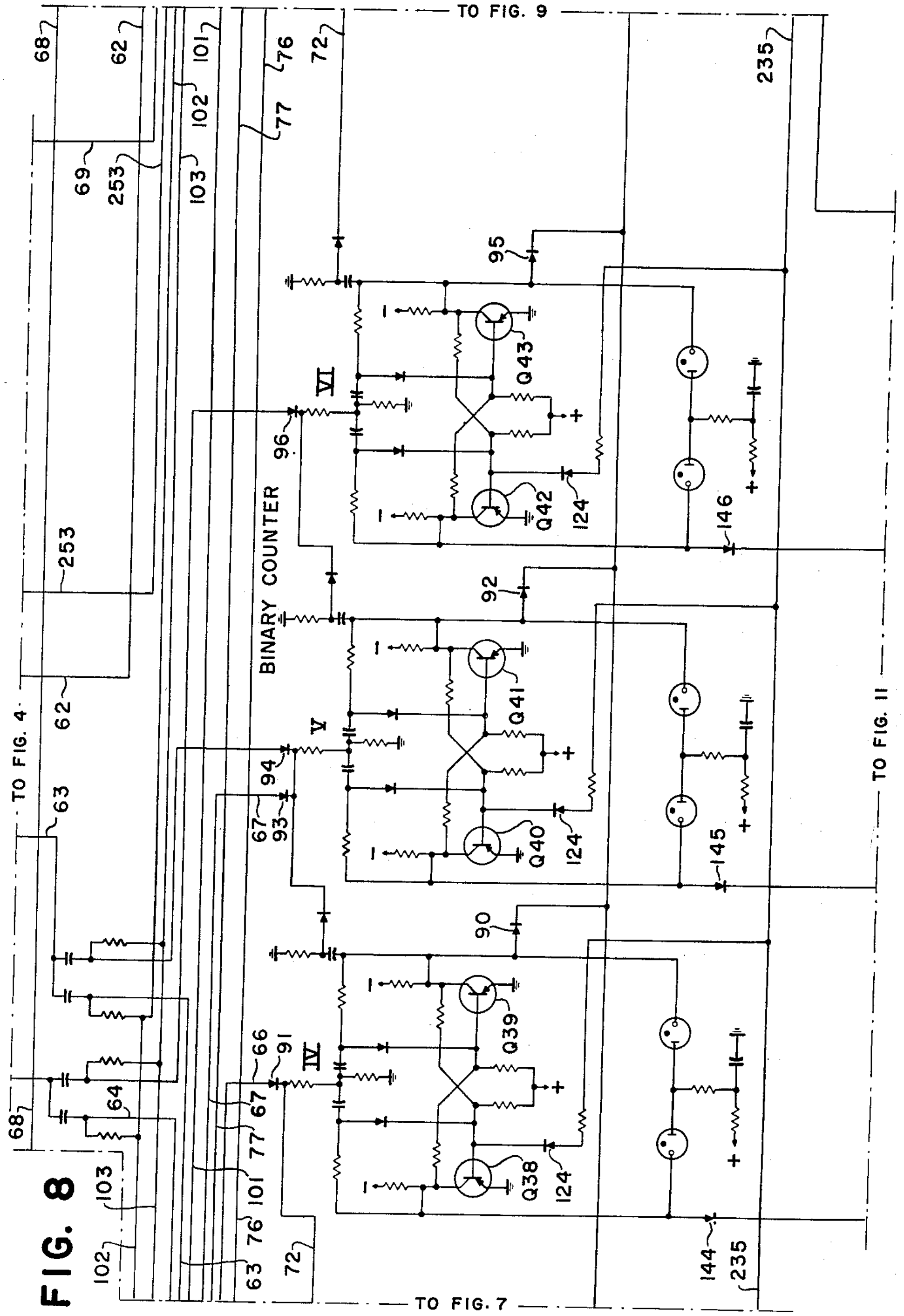
Figure 9:
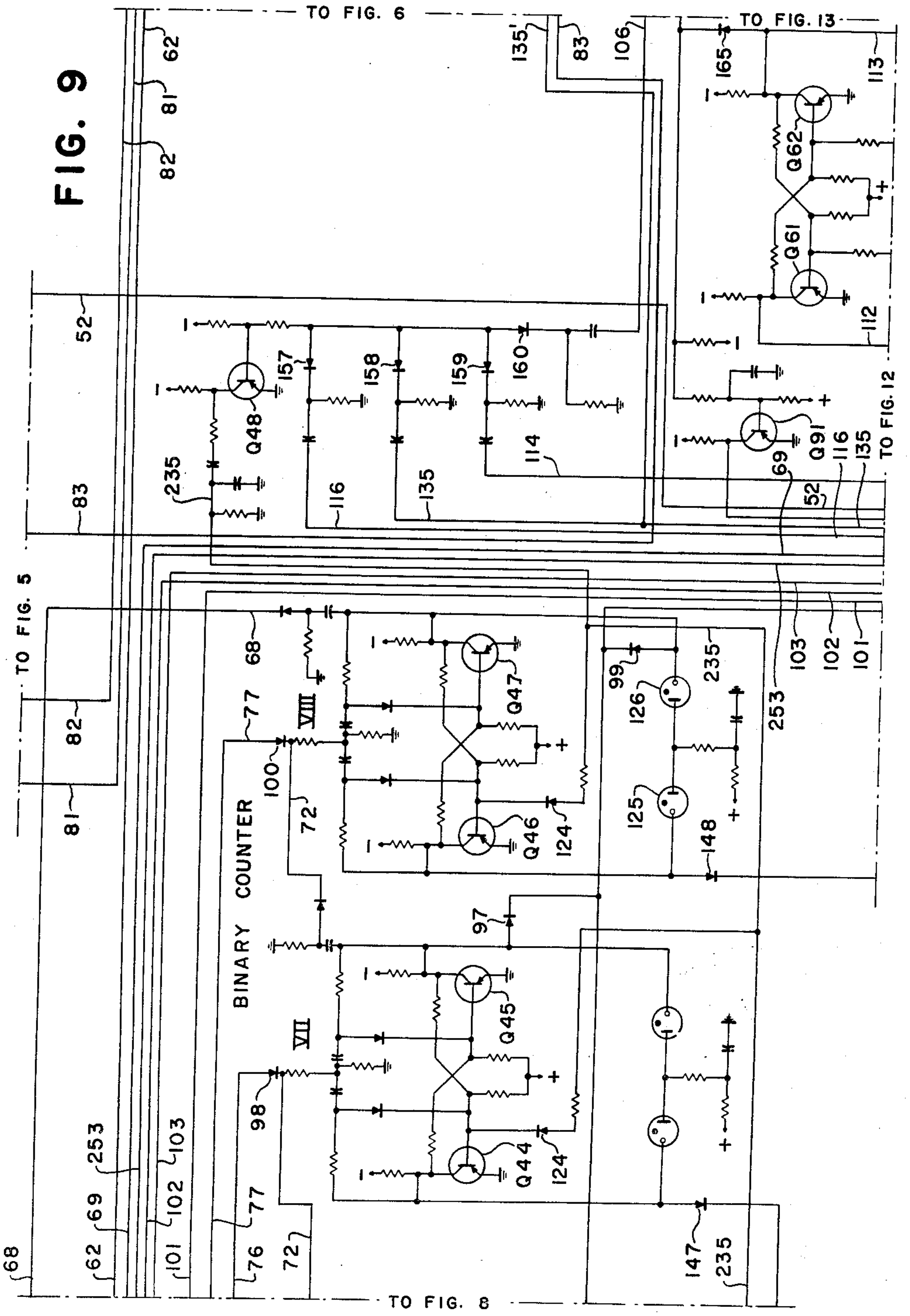
Figure 10:
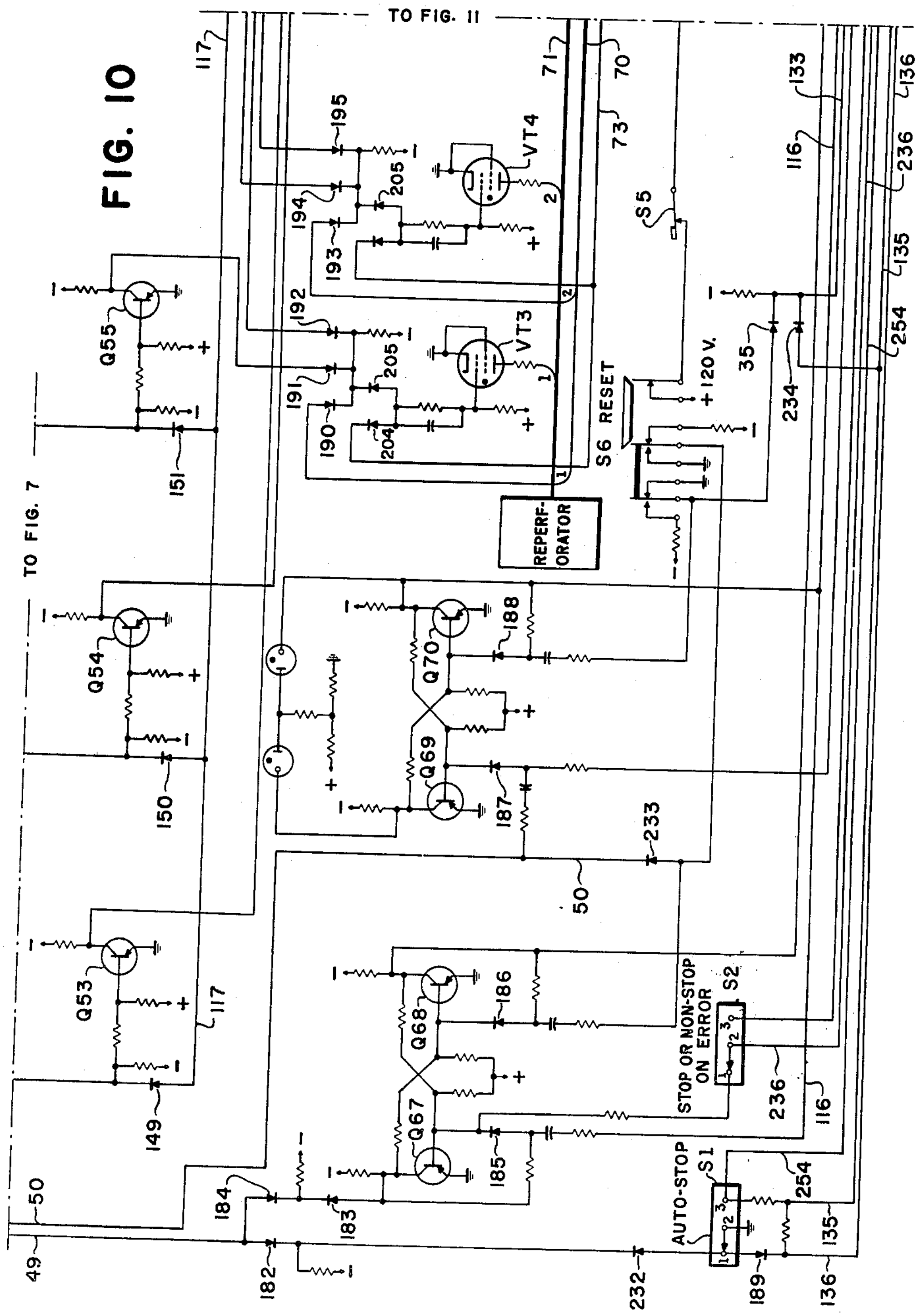
Figure 11:
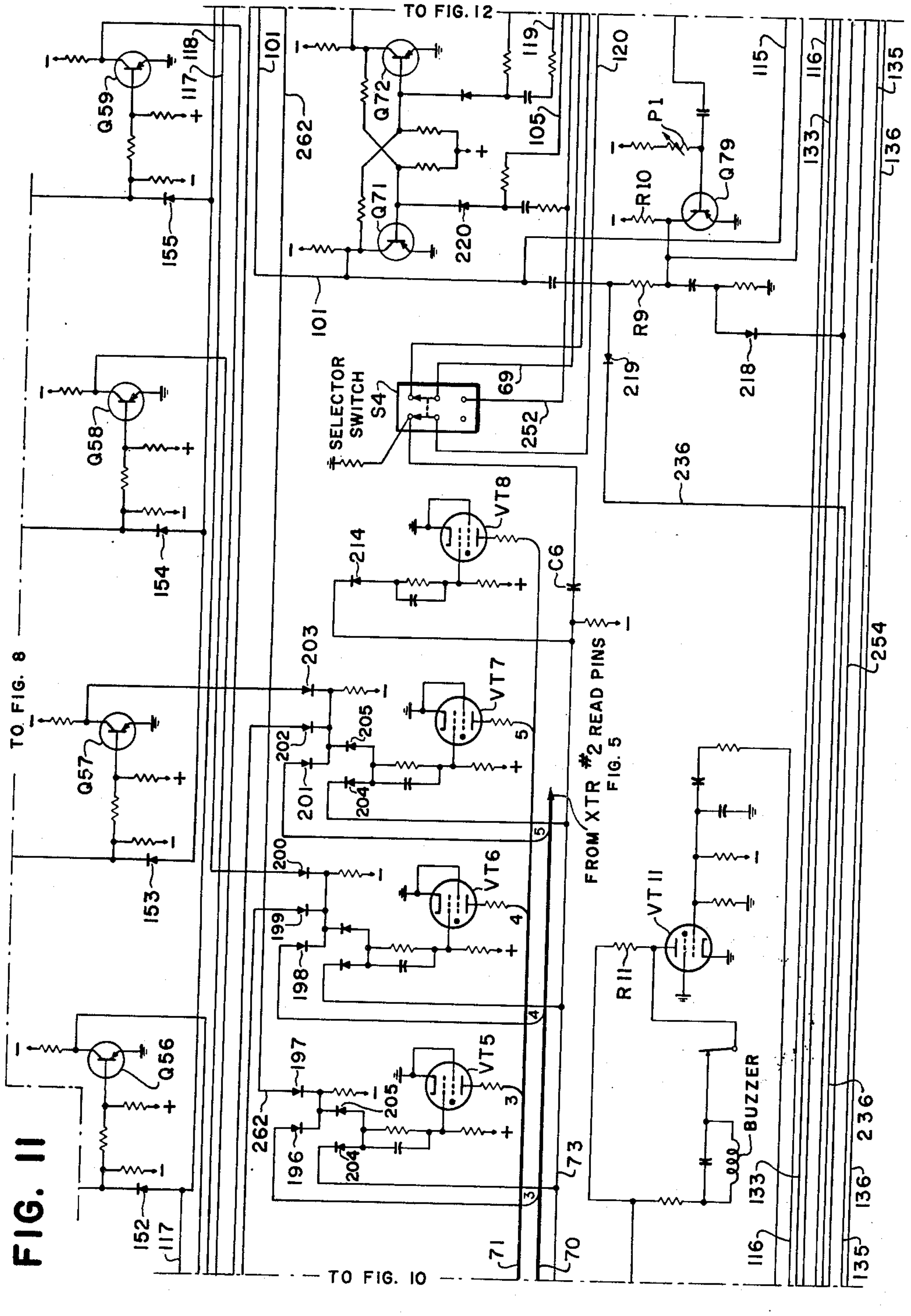
Figure 12:
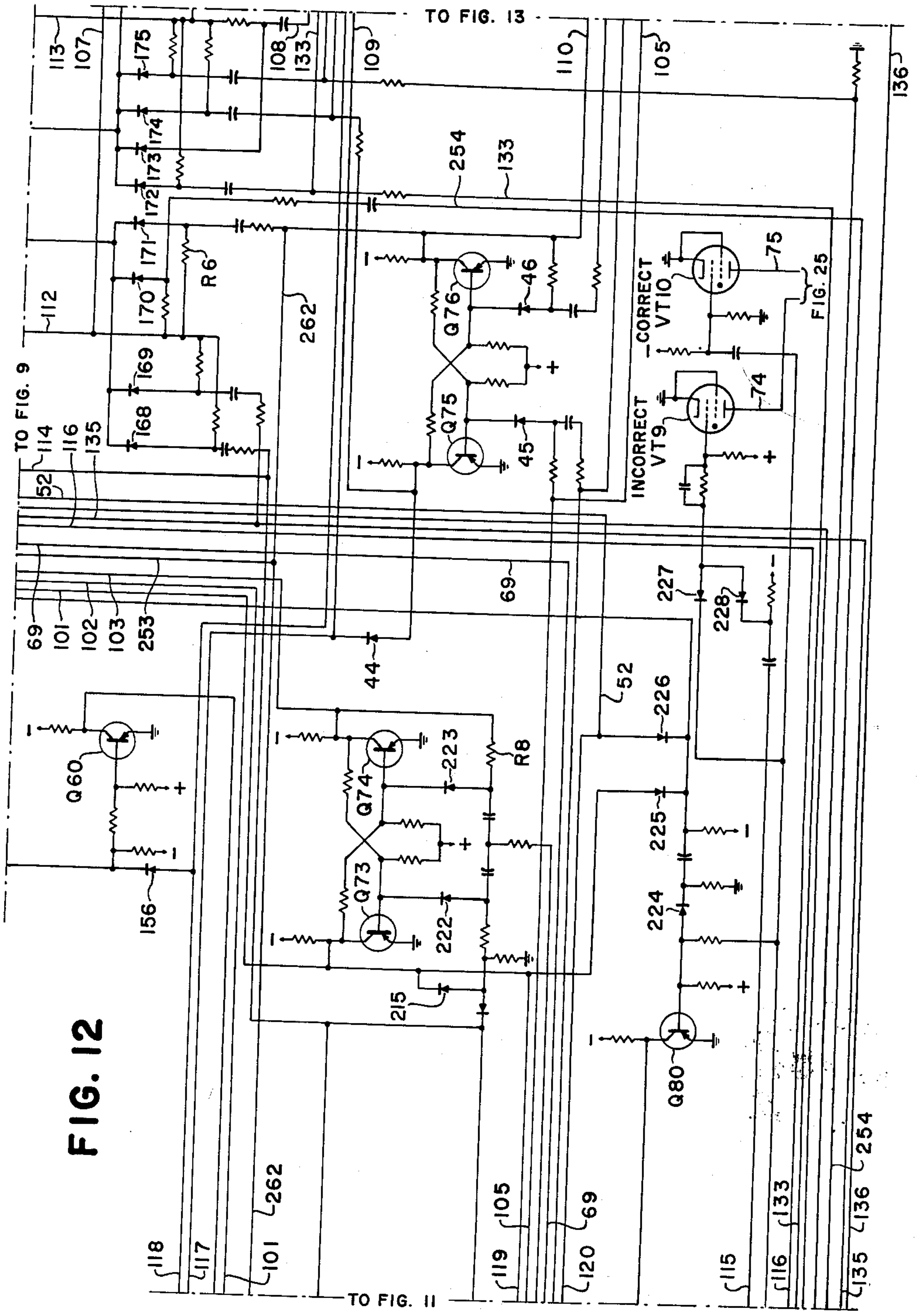
Figure 13:
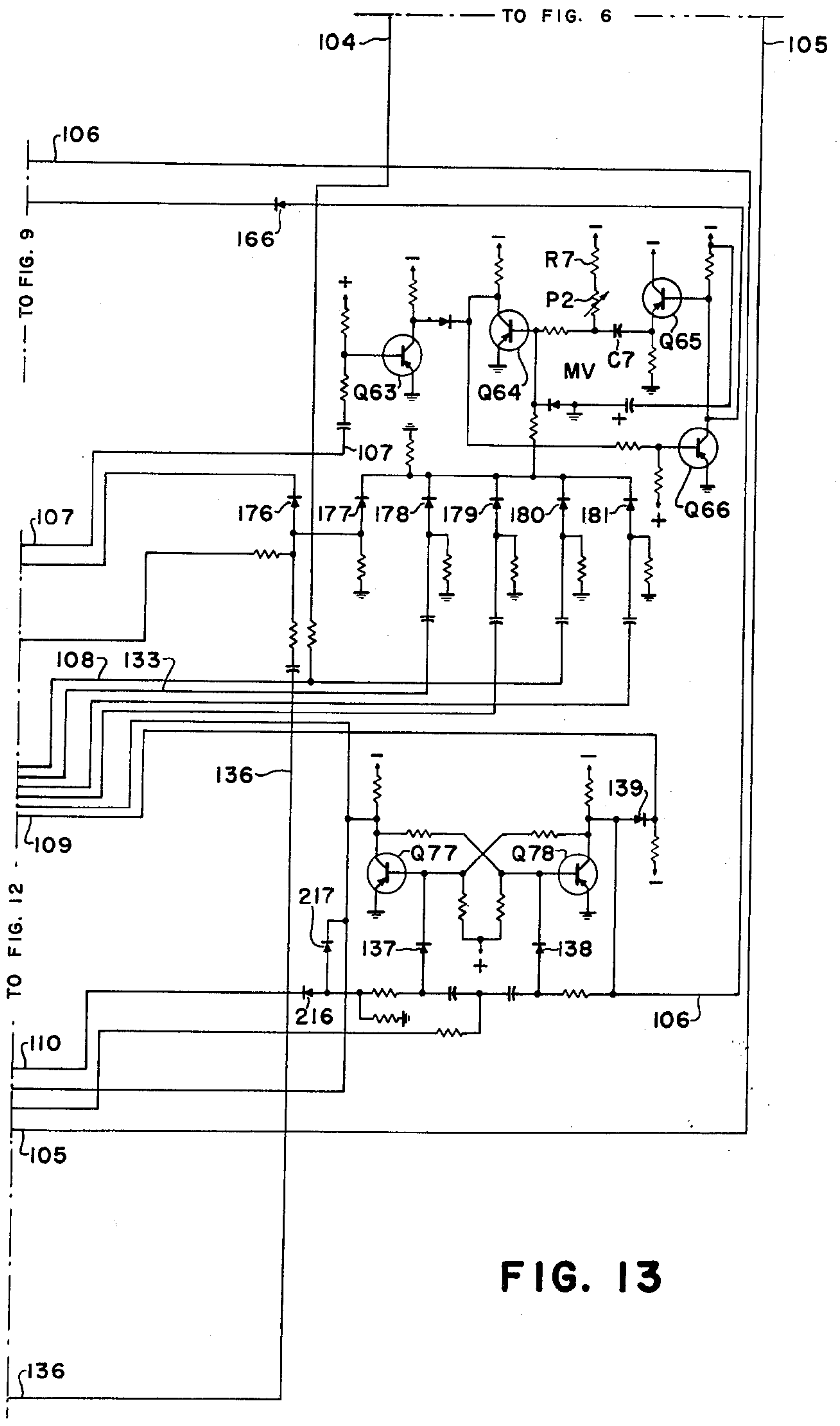

Figs. 3 to 13 inclusive, when arranged with respect to each other in the manner indicated in Fig. 27, show the various circuit details involved in the sending end. In this group the various units are shown generally on the different figures as follows: Fig. 3 shows a drive and pulse generator in the lefthand portion of the figure, two stages of a distributor, and stages (1), (2) and (3) of a 5-stage buffer storage. Fig. 4 shows the third stage of the distributor, a tape stepping circuit, stages (4) and (5) of the buffer storage, and the #1 set of pins of the dual pin tape transmitter Xtr. Fig. 5 shows the #2 set of pins of the tape transmitter, and the Character Reading Matrix. Fig. 6 shows a sequential character reading network. Figs. 7, 8 and 9 show the eight stages I–VIII of the binary computer. Figs. 9, 10, 12 and 13 show units of the "long block" timer circuit. Figs. 10 and 11 show thyratron tube circuits for controlling the reperforator. Figs. 10, 12 and 13 show various other control circuits.

As hereinbefore set forth the dual pin tape transmitter performs the functions of transferring the characters in the original data tape to the reperforator that is punching the new tape, reading the control characters, and inserting the characters into the eight-stage binary counter of Figs. 7 to 9. Preferably, and as shown, the fifth code level, which is farthest from the tape feed wheel and therefore most susceptible to error, is connected by a conductor 63 from stage (5) of the buffer storage, Fig. 4, to Stage I, Fig. 7, of the binary counter. In effect then the 5th code level will be checked the most times. The fourth and first levels, which are next farthest from the feed wheel, are connected by conductors 64 and 65, from stages (4) and (1) of the buffer storage to stages II and III, respectively, of the counter. The second and third levels, which are closest to the feed wheel, and least susceptible to error are connected by conductors 66 and 67 from stages (2) and (3) of the buffer storage to stages IV and V, respectively, of the counter.

Ordinarily an 8-stage binary counter when operating with the above stated binary weights as check values of the various code levels would recycle when a count of 256 was reached, and this is disadvantageous for the following reasons: If, for example, due to failure of the transmitter contacts to close in the 5th code level or for some other reason such as sticking code bars or other faults in a particular code level, 16 marking pulses (or a multiple of this number) should be lost in a line or block of data, and the computer should recycle at a count of 256, such errors would not be reflected in the check sum. Similarly, if 32 errors (or a multiple thereof) in a line or block of data should be encountered in code level 4, the total would be 256, and again such errors would not be reflected in the check sum.

Preferably, and as shown herein, the foregoing possibility of error is obviated by causing the binary computer to recycle whenever a count of 255 is reached, that is, the computer has a modulus of 255 which does not represent a multiple of the binary weight assigned to any code level. This is effected by applying the output of the last stage VIII of the counter, over conductor 68, to the input of the first stage I thus causing an extra count pulse to be generated within the computer once during each full cycle of computer operation. The computer will now recycle with a total of 255 since a count of 1 is generated within the computer and added thereto. The first code level, which has a binary weight of 1, will now require 255 omission errors or 255 addition errors to recycle the computer. The second code level has a binary weight of 2; if the computer had a modulus of 256 then in the second code level 128 like errors times 2 would equal 256 and the computer would be recycled. However, with the present modulus of 255, the computer will be recycled and have a count of 1 added thereto, so that an additional 127 such like errors would be required to recycle the computer. Thus, the second level would require 255 errors for recycling. Likewise, the remaining code levels 3, 4 and 5 each would require 255 like errors for recycling the computer. So long as a line or block of information is less than 255 characters, the computer can not be recycled by a string of errors in any one code lovel. The arrangement avoids the need for a computer having a large number of stages with the consequent higher cost, and also avoids the necessity of transmitting the larger number of check signals attendant thereto and the resulting loss of line time in transmitting such check signals, and this without affecting the accuracy of the checking operations.

*Drive and pulse generator.*—Referring to Fig. 3, a source 48 of alternating current derived from a transformer supplies positive pulses of approximately 6.3 volts in magnitude at a frequency of 60 cycles. This signal is coupled through a diode 248 and clamped to +5 volts by a diode 249 at the base of a transistor Q84. Transistors Q84 and Q89 perform the function of squaring the incoming sine wave signal from source 48, so that a square wave 15-volt, 60-cycle signal appears at the input of a transistorized flip-flop Q87, Q88. Flip-flops Q87, Q88 and Q85, Q86, comprise a two-stage counter which operates as a frequency divider that results in the output waveform of transistor Q85 being 20 volts, 20 cycles/second. This output waveform now becomes the main drive of the pulse generator. If the Auto-Stop switch S1 seen in the lower left hand portion of Fig. 10 is thrown to the left as in the position shown, so as to make a diode 232 conduct, diode 182 of the same figure is not conducting. Thus, by means of a conductor 49, the anode of a diode 250, Fig. 3, is at ground potential through resistances R1, R2 which together total 492K ohms. When the positive pulse from the transistor Q85 arrives at diode 250, the diode conducts because its anode is at ground potential, causing a transistor Q1 to cut off. This pulse from transistor Q85 also appears on the base of a transistor Q3. Transistors Q2 and Q3 comprise an astable multivibrator that is now free to run because the base of transistor Q2 has a negative potenital supplied to it, inasmuch as transistor Q1 is not conducting. Before the pulse arrived to cut off transistor Q1, the base of transistor Q2 was at ground potential; therefore, the astable multivibrator was prevented from running. The positive pulse that turned transistor Q1 off also appeared at the base of Q3. The purpose of this pulse is to switch the astable multivibrator quickly so that the negative potential appearing through resistors R4 and R5 at the cathodes of diodes 250 and 34 will be removed because diode 231 conducts to ground as soon as the astable multivibrator switches.

As the diode 231 goes to conduction and applies a ground at the cathode of diodes 231, 14 and 15, it removes the negative potential supply from the base of transistor Q1 and allows the astable multivibrator to continue to run because the collector of transistor Q1 is negative. The multivibrator will continue to run until the foregoing diodes cease to conduct. When all of them have stopped conducting at the same time, the base of transistor Q1 will again receive the negative potential through the resistors R4, R5, transistor Q1 will conduct and the astable multivibrator will stop with Q3 conducting. The cycle just described will continue to repeat itself. If the Auto-Stop switch S1 of Fig. 10 is thrown to the right (terminal 2 connected to terminal 3), the diode 232 is not conducting, diode 182 is conducting, and the anode of diode 250, Fig. 3, is negative. Any positive pulse from transistor Q85 will not cause the diode 250 to conduct, and transistor Q1 will not be turned off; therefore the astable multivibrator will remain in the stopped position.

A single step manually-operated momentary switch S3, seen in the lower left hand portion of Fig. 3, is also supplied that allows the multivibrator to run for one cycle and then stop. This is done by having the capacitor on the anode of diode 34 charge to ground on the diode side and to −20 volts on the switch side. When the switch is thrown to the left, the capacitor's charge is changed from −20 volts to ground and this change causes diode 34 to conduct. The cycle of transistor Q1 cutting off and the astable multivibrator running is then repeated as described above. However, when transistor Q1 goes back to conduction, there no longer are any pulses appearing at the base of the transistor and therefore it will remain stopped.

During a running cycle, the output of transistor Q3 goes into an emitter follower Q4 and then into two inverter amplifiers Q5 and Q6. This is done to obtain high input impedance from transistor Q3, signal squaring, and low output impedance. The output from inverter amplifier Q6 is then fed into the first stage of a three-stage binary counter in the distributor, Figs. 3 and 4. This 3-stage binary counter has feedback from transistors Q12 of Fig. 4 to Q8 of Fig. 3 to enable it to count to seven. The binary counting of seven is then decoded by means of diodes 10 through 31 and 229 through 231 to derive seven distinct time pulses. These seven pulses are identified as follows: Stop, No. 1, No. 2, No. 3, No. 4, No. 5 and Operate. The Stop and Operate pulses are also gated with transistor Q5 which is running at twice the frequency of flip-flop Q7 Q8 in order to obtain the first half of the Stop pulse and the first half of the Operate pulse. The stop pulse is gated into transistor Q1 and performs the function of stopping the binary counter in the distributor after each cycle. It is then restarted in the manner previously described.

*Transmitter drive and reading.*—The step magnet *m*, Fig. 4, of the dual pin transmitter is energized when a thyratron VT1 goes to conduction. At the end of the operate pulse the output of the cathodes of diodes 29, 30 and 31 goes from −20 volts to ground. This positive going change is coupled through a capacitor C1 and diode 8 to the grid of thyratron VT1 and causes this thyratron to fire. The thyratron remains fired until thyratron VT2 goes to conduction. When VT2 conducts its plate goes from +120 volts to ground. This negative going change is coupled through a capacitor C2 from the plate of thyratron VT1, causing VT1 to be extinguished. This causes the step magnet *m* which is in series with the plate of VT1 to be deenergized and the transmitter pins to be released, allowing them to read the next characters in the tape. VT2 goes to conduction at the end of the No. 1 pulse.

When the voltage at the cathodes of diodes 229, 230 and 237, Fig. 3, and 233, Fig. 10, over conductor 50, changes from −20 volts to ground, a positive going signal is derived and it is coupled through a capacitor C3 and diode 9 to the grid of thyratron VT2, causing it to fire. This, as previously described, extinguishes VT1. When VT1 fires, VT2 is extinguished, and in this manner the transmitter is stepped at a frequency of one step per revolution of the binary counter.

The #2 pins, Fig. 5, of the dual pin transmitter Xtr sense the tape one character after the #1 pins read it. The #1 pins are used only to insert the information, over cable 51, through the buffer storage and conductors 63 to 67 into the eight-stage binary counter of Figs. 7 to 9; the #2 pins transfer the selection from the transmitter to the reperforator and read the control characters. The five outputs of the #2 pins are gated through a cable 70, through diodes 190, 193, Fig. 10, and 196, 198 and 201, Fig. 11, into the grids of thyratrons VT3 through VT7. These thyratrons control, through a cable 71, the selector magnets of the reperforator shown in block diagram form in Fig. 10. The outputs of the #2 pins, Fig. 5, are also inverted by transistors Q81, Q82, Q23 and Q24. The signal that is read by the #2 pins and the output of their inverters is then decoded by a diode matrix, identified by the legend "Character Reading Matrix," Fig. 5. This matrix enables the system to read letters shift (Ltrs), F, A, H, figures shift (Figs,) and carriage return (CR). The sequential reading of Figs, A, Ltrs, and Figs, A, F, Ltrs, is performed by having the individual characters that have been gated out by the reading matrix appearing as the pedestal input of flip-flops of Q25 Q26, Q27 Q28, Q30 Q31, Q49 Q50, seen in Fig. 6. All of these flip-flops except Q49 Q50 have a common input trigger, the first half of the Operate pulse on the set side appearing over conductor 52′. By the time this pulse arrives the transmitter pins have had ample time to settle and be divorced from any contact bounce. When Figs is read, flip-flop Q25, Q26 is set. On the next cycle it will be reset unless the next character to be read is another Figs. If the next character is an A, the resetting of flip-flop Q25, Q26 will set flip-flop Q27, Q28.

Again, on the next character, flip-flop Q27, Q28 will be reset and flip-flop Q49, Q50 will be set if that character is Ltrs. This will cause transistor Q50 of the flip-flop to go to conduction, and when this transistor is conducting the eight-stage binary counter is activated, over conductor 62, and the counter is in the "on" condition. This is signified on the control panel by the "computer on" neon light, Fig. 6 being on. If the computer is on and the character sequence of Figs, A, F, Ltrs is read, the preceding operation is duplicated. However, after flip-flop Q27, Q28 is reset and the next character is F, flip-flop Q30, Q31 is set. On the next character, flip-flop Q30, Q31 is reset and if this character is Ltrs, flip-flop Q49, Q50 is switched so the transistor Q49 goes to conduction, and the eight-stage binary counter is deactivated and the counter is in the "off" condition. This is signified on the control panel by the "computer off" neon light being on. If transistor Q50 of the flip-flop is off, diode 140 conducts. This diode is connected, over conductor 78, to the carriage return reading network and prevents the reading of carriage return with the counter in the "off" condition. When transistor Q50 goes to conduction, diode 140 no longer conducts and the reading of carriage return is allowed.

The #1 pins, Fig. 4, of the tape transmitter introduce the information from the tape, over cable 51 and the buffer storage units, into the first five stages of the binary counter, but only when the counter is on. The flip-flops Q13, Q14 to Q21, Q22 act as buffer storage between the #1 pins of the transmitter and the counter. It the transistor Q50, Fig. 6, of the flip-flop Q49, Q50 is off (the counter is then off), diodes 132 in the five stages (1) to (5) of the buffer storage, and which are connected to a conductor 62, will all be conducting, and their respective anodes will be negative. This negative voltage will prevent the five buffer storage flip-flops from switching, and therefore no pulses will be delivered to the counter. The transistor Q50 of Fig. 6 will go to conduction at the end of the first half of the Operate pulse, during the cycle when the Ltrs of Figs, A, Ltrs sequence is being read by the #2 pins of the tape transmitter. At this time the selection that is being read by the #1 pins will be seen at the pedestal input of the five buffer storage flip-flops, through cable 51, because the negative clamp that was applied, over conductor 62, by transistor Q50 has been removed.

The probe pulse, over conductor 61, that sets these five buffer storage flip-flops if the selection of #1 pins is marking or ground is derived at the end of the Operate pulse, thereby allowing the character that is over the #1 pins at the same time that the Ltrs of Figs, A, Ltrs is over the #2 pins to be placed into buffer storage. During the next cycle, the five buffer storage flip-flops are reset serially with the No. 1 pulse from the pulse generator resetting flip-flop Q13, Q14, the No. 2 pulse resetting flip-flop Q15, Q16, the No. 3 pulse resetting flip-flop Q17, Q18, the No. 4 pulse resetting flip-flop Q19, Q20, and the No. 5 pulse resetting flip-flop Q21, Q22. The positive pulses derived from transistors Q13, Q15, Q17, Q19 and Q21 when the five buffer storage flip-flops are reset (provided that they were set) are steered through control circuits 63–67 to the appropriate stages in the eight-stage binary counter. By the time the next Operate pulse is derived, the buffer storage flip-flops have been reset, and the next character is placed into buffer storage. This cycle is continued until the sequence of Figs, A, F, Ltrs is read by the #2 pins, and transistor Q50 of Fig. 6 is cut off. At that time the negative clamp from the transistor will appear at the pedestal input of the five buffer storage flip-flops to prevent them from switching.

*Eight-stage binary counter.*—The binary counter is composed of eight stages I to VIII respectively comprising flip-flops Q32, Q33 to Q46, Q47. The input to each stage of the counter (except the first) is is derived from the output of the preceding stage over conductors 72. The input of the first stage is derived from the output of the last stage over conductor 68. Besides this usual arrangement for binary counting, the first five stages I to V have distinct inputs over the conductors 63 to 67 from the five buffer storage flip-flops during normal operation. When the sequence Figs, A, Ltrs is read and transistor Q49 of Fig. 6 goes from ground to −20 v., a negative going pulse is derived from the transistor Q49, which over conductors 135′, 135 and through a capacitor and diode 158, Fig. 9, causes the transistor Q48 of the latter figure to go to conduction. When the transistor Q48 conducts, its collector goes from −20 v. to ground, and this positive going change is coupled through a capacitor and over conductor 235 to diodes 124, Figs. 7 to 9, in each of the stages of the computer to reset the binary counter, causing the right hand transistor Q33, etc., of each pair in the counter to conduct. This is the "0" state of the counter, and neon light 125, 126 associated with each stage on the control panel will all be off.

At the end of the next No. 1 pulse from the pulse generator, flip-flop Q13, Q14 of stage (1) of the buffer storage will be reset, provided it was set due of the marking condition of the #1 read pin from the dual pin transmitter #1 pins. The positive going pulse derived from transistor Q13 of stage (1) resetting is differentiated by two capacitors C4, Fig. 7, and is seen at the anode of diode 89 of Fig. 7 and 98 of Fig. 9. However, the anode of diode 89 is at ground potential through 22K ohms while the anode of diode 98, Fig. 9, is −20 v. through a resistance of 24.5 Kohms. These voltage conditions exist on diodes 89 and 98, 91 and 100, 87 and 96, and 85 and 94, respectively, and a ground exists on the anode of diode 93 of Fig. 8 because normal counting is taking place and their biases will only be altered when checking is being done; this will be described in detail later. The positive going pulse at the anode of diode 89, Fig. 7, causes it to conduct because it is at ground bias while the positive pulse at the anode of diode 98 of Fig. 9 has no effect because it is at −20 v. bias. Diode 89 conducting causes flip-flop Q36, Q37 of stage III to switch. Thus, a No. 1 pin marking in the transmitter #1 pins has caused the third stage of the binary counter, which has a binary value of 4, to be switched.

At the end of the No. 2 pulse, flip-flop Q15, Q16 of stage (2) of the buffer storage is reset, provided it was set by the No. 2 pin marking. A positive pulse is derived from the collector of transistor Q15, differentiated, and is seen at the anodes of diodes 91 and 100. The anode of diode 91 is ground and the anode of diode 100 is −20 v. Therefore, only diode 91 conducts and flip-flop Q38, Q39 of stage IV is switched. This procedure continues until the entire character is read out of buffer storage. With the next character the process is repeated with the marking state of the tape being transferred through buffer storage to the binary counter. The first, second, third, fourth and fifth stages of the binary counter accept pulses from both the buffer storage flip-flops and the preceding stage of the counter. In this manner the binary addition of the characters in the perforated tape is made with each level of the tape having a different binary value. Any information from the tape coming into the counter after it has reached a count of 255 will cause, over conductor 68, an extra count pulse to be generated within the counter once during each full cycle of counter operation, i.e., the computer will recycle with a total of 255 since a count of 1 is generated within the computer and added thereto.

*Reperforator drive.*—The thyratrons associated with the reperforator diagrammatically shown in Fig. 10 are thyratrons VT3 through VT8, with VT8 driving the sixth pulse or clutch magnet. The mark or space condition of the transmitter #2 pins, over cable 70, is gated into the grids of thyratrons VT3 through VT7 by diodes 190, 193, Fig. 10, and 196, 198 and 201, Fig. 11. If the transmitter #2 pins are at ground potential, the respective diodes 190, 193, 196, 198 and 201 will not conduct. However, the cathodes of diodes 204 associated with the thyratrons, together with the diode 214 associated with the grid of the sixth pulse thyratron will be negative, causing all of these diodes to conduct. The conduction of these diodes keeps the grids of the thyratrons VT3 through VT8 at a negative potential.

When the selector switch S4 of Fig. 11 is thrown upwardly to the "operate" position, as shown, the pulse derived during the first half of the Operate pulse appears at the capacitor C6 which is connected to the cathodes of diodes 204. At the end of the first half of the Operate pulse, the differentiating circuit causes the cathodes of the diodes 204 to rise to ground potential. This will cause the grids to rise above ground and the tubes to fire. Tube VT8 will fire at each end of the first half of the Operate pulse. Tubes VT3 through VT7 will also fire, but only if a ground appears at the cathodes of diodes 205. If a space is present at the appropriate pin of the transmitter, and the anodes of diodes 191, 192, 194, 195, 197, 199, 200 and 203 are −20 volts, the appropriate grids of the tubes VT3 through VT7 will be held negative, even when the probe pulse arrives over conductor 73. This negative potential will prevent the tubes from firing.

Under normal operation, the anodes of diodes 191, 192, 194, 195, 197, 199, 200, 202 and 203 are negative; however, during the insertion of check characters the transmitter is stopped with the pins spacing. When this occurs the complement of the counter sum is read out through these diodes and, depending upon the sum in the counter, will be the instrumental factor in determining whether the diodes 205 conduct or do not conduct. It is appropriate to note at this time that, if the selector switch S4 is thrown downwardly to the "check" position, no probe pulse appears at the grids of thyratrons VT3 through VT8 and therefore the reperforator will not operate.

*Check character generation.*—Transistor Q75 of the flip-flop Q75, Q76 of Fig. 12 normally is conducting or is at ground potential. This condition causes the cathodes of diode 44, Fig. 12, and diode 139, Fig. 13, to be at ground, and this ground potential is gated over conductor 117 into the bases of transistors Q53, Q54, Q55, Fig. 10, and Q56, Fig. 11, through diodes 149 to 152 to keep these transistors nonconducting. Transistor Q77 of the flip-flop Q77, Q78, Fig. 13, is normally at ground potential, and this ground potential is gated into the bases of transistors Q57 to Q60 through diodes 153, 154, 155, Fig. 11, and 156, Fig. 12, to keep these transistors nonconducting. The fact that the transistors Q53 through Q60 are not conducting prevents the state of each stage of the eight-stage binary counter from appearing at the diode selection network of the grids of tubes VT3 through VT7.

After the sequence Figs, A, Ltrs has been read and the binary counter activated, the tape is stepped through the transmitter at a desired rate, for example, at 200 words per minute, until the carriage return character is read. This reading is allowed because diode 140 of Fig. 6 is not conducting. The reading of carriage return by the #2 pins signifies the end-of-block even though the character over the #1 pins is the first character of the next block. This reading of carriage return applies, over conductors 78 and 105, a ground through 44K ohms resistance to the anodes of diodes 45 and 220, Figs. 12 and 11.

At any character other than carriage return this voltage is —20 v. through 22K ohms resistance. If the selector switch S4 of Fig. 11 is thrown up in its Operate position, the probe pulse (the end of the Operate pulse) will appear at flip-flop Q75, Q76, Fig. 12, which is associated with diode 45, and not at the flip-flop Q71, Q72 which is associated with the diode 220. Therefore, at the end of the Operate pulse, when carriage return is being read by the #2 pins, flip-flop Q75, Q76 will switch and transistor Q76 will go from —20 v. to ground. At the time that flip-flop Q75, Q76 switched, the tube VT1 of Fig. 4 fired, energizing the step magnet *m*, and the character that was over the #1 pins of the transmitter was placed into the buffer storage flip-flops. This character is the first character of the next block of data, and it is not desired to add it into the eight-stage binary counter until the check characters for the block preceding and including the carriage return just read have been generated. When transistor Q76 goes from —20 v. to ground, the emitter of transistor Q90, Fig. 4, is clamped to ground, over conductor 253, causing diodes 41, Fig. 4, 40, 39, 38, 37 and 42, Fig. 3, to conduct, thereby preventing the generation from the pulse generator of the No. 1 pulse, No. 2 pulse, No. 3 pulse, No. 4 pulse, No. 5 pulse, and the pulse that causes thyratron VT2 to conduct. Therefore, the transmitter is stopped, the step magnet is energized, and the first character of the next block that has been placed in buffer storage will not be read out.

Transistor Q76 of Fig. 12 conducting to ground also caused over conductor 262, diode 197, Fig. 11, to conduct, making the cathodes of diode 196, 197 and 209 ground. This will cause thyratron VT5, the third pulse thyratron, to be fired when the probe pulse, over conductor 73, is present. Because transistor Q75, Fig. 13, has gone from ground to —20 v., diode 44 of Fig. 12 is not conducting. This removes the ground clamp that is normally held by conductor 117 on transistors Q53 to Q56. The output of the first four stages of the eight-stage binary counter is then gated through diodes 141 to 144, Figs. 7 and 8, into transistors Q53 through Q56. The "0" or reset conditioning of the flip-flops of the binary counter will cause transistors Q32, Q34, Q36, Q38, Q40, Q42, Q44 and Q46 to be at —20 v. or in the nonconducting state. The check characters to be generated will be composed of the complement of the sum in the binary computer. Therefore, when the read-out circuit (for the first four stages) is activated, the output of the reset side of these stages is gated into transistors Q53 to Q56, Figs. 10 and 11, through diodes 141 to 144. If the stage is in the reset condition, the appropriate read-out transistors will conduct, causing a ground to appear at the diode selection network associated with the grid of the selected thyratron. The tube will not fire until the probe pulse arrives over conductor 73. If the stage is in the set condition, the appropriate read-out transistor will not conduct, causing —20 v. to appear at the diode selection network associated with the grid of the selected thyratron; therefore, the tube will not fire when the probe pulse arrives.

At the following first half of the Operate pulse after the flip-flop Q75, Q76 of Fig. 12 was set, the status of the first four stages of the binary counter is stored in the appropriate thyratrons; the first stage into thyratron VT7 through diode 202 of Fig. 11; the second stage into thyratron VT6 through diode 199; the third stage into thyratron VT3 through diode 191, Fig. 10; and the fourth stage into thyratron VT4 through diode 194. Thyratron VT5 is conditioned to fire, over conductor 262, because of Q76 conducting, applying a ground through diode 197 of Fig. 11. At the end of the next Operate pulse, flip-flop Q77, Q78 of Fig. 13 switches. Transistor Q77 which was conducting caused diode 217 to be nonconducting. When the flip-flop Q75, Q76 switched, diode 216 went from conducting to nonconducting. When both diodes 217 and 216 were not conducting, flip-flop Q77, Q78 was conditioned to switch because the anode of the input diode 137 was at ground through 55K ohms. When flip-flop Q77, Q78 switches, transistor Q78 goes from —20 v. to ground, and transistor Q77 goes from ground to —20 v. Diode 139 now conducts, causing ground to appear at the cathodes of diodes 149, 150, 151, Fig. 10, and 152, Fig. 11. This ground prevents transistors Q53, Q54, Q55 and Q56 from conducting, thereby preventing the condition of the first four stages of the binary counter from appearing at the diode selection network of the thyratron grids. However, transistor Q77 of Fig. 13 going to —20 v. causes, over conductor 118, diodes 153, 154, 155 and 156 to stop conducting. This allows the condition of the second four stages of the counter to be read out through diodes 145, 146, Fig. 8, and 147, 148, Fig. 9, into transistors Q57, Q58, Q59 and Q60, Figs. 11 and 12. At the end of the next first half of the Operate pulse, the state of these stages is stored in the thyratrons; the fifth stage into thyratron VT7 through diode 203, the sixth stage into thyratron VT6 through diode 200, the seventh stage into thyratron VT3 through diode 192, and the eighth stage into thyratron VT4 through diode 195.

Thyratron VT5 is again conditioned to fire because of transistor Q76 still conducting applying a ground through diode 197 of Fig. 11. The fact that transistor Q76 is still conducting continues to prevent the transmitter from stepping and the selection that is in buffer storage from being read out. At the next end of the Operate pulse, flip-flop Q77, Q78 switches back to its reset condition because the anode of diode 138 of Fig. 13 is at ground through 47K ohms from the collector of transistor Q78. The anode of diode 137 is negative because transistor Q77 is —20 volts, causing diode 217 to conduct. When flip-flop Q77, Q78 switches back, a positive pulse is derived from transistor Q77 and it is coupled through diode 46, Fig. 12, whose anode is at ground through 47K ohms from the collector of Q76.

When flip-flop Q77, Q78 is reset, a negative-going pulse over conductor 106 is derived from transistor Q78, causing diode 160 of Fig. 9 to conduct. This pulse causes transistor Q48 to conduct and the 8-stage binary counter is reset in the same manner as previously described. When flip-flops Q75, Q76 and Q77, Q78 have been reset, the counter has been reset to "0," the clamp on the No. 1 through 5 pulses from the pulse generator has been removed, the read-out transistors Q53 through Q60 are disengaged, and the clamp on the transmitter stepping circuit has been removed. Therefore, the character stored in buffer storage (the first character of the next block) is read out into the 8-stage binary counter, the transmitter resumes stepping, inserting the information into the 8-stage binary counter and into the reperforator, i.e., normal operation has been resumed. This check character generation cycle will occur each time carriage return is read, until the reading of the sequence Figs A, F, Ltrs by the #2 pins is performed.

*Checking at sending station.*—It is possible to check the tape containing the check characters that has been prepared at the sending end. By throwing the selector switch S4 of Fig. 11 downward from "operate" to "check," the reperforator is disengaged, and the probe pulse over conductor 69 is switched to flip-flops Q71, Q72 and Q73, Q74 via conductor 252, from flip-flops Q75, Q76 and Q77, Q78. The processed tape is then introduced into the dual pin transmitter, and the address is idled through. When Figs, A, Ltrs is read in the same manner as before, the binary counter is reset as before, and information from the #1 pins of the transmitter is introduced into the counter as before. Transistor Q71 of the flip-flop Q71, Q72 is normally conducting to ground. This ground voltage appears, over conductor 101, through 22K ohm resistors at the anode of diode 93 of Fig. 8 and allows the output of flip-flop Q17, Q18 of buffer storage to drive the fifth stage flip-flop Q40, Q41 of the binary counter. Transistor Q73 of the flip-flop Q73, Q74 is normally conducting to ground. This zero voltage appears through separate 22K ohm resistors at each of the anodes of diodes 89, 91, 87 and 85 and allows the outputs of the flip-flops of buffer storage to drive the third, fourth, second and first stages, respectively, of the binary counter.

The collector of transistor Q74 of the flip-flop Q73, Q74, Fig. 12, is normally —20 volts or nonconducting. This negative collector voltage appears through separate 22K ohm resistors at each of the anodes of diodes 98, 100, 96 and 94 and prevents the outputs of the flip-flops of the buffer storage from driving the seventh, eighth, sixth and fifth stages, respectively, of the binary counter. With these voltages applied as biases on the steering network diodes, the information in the tape is added binarily in the counter. During the check character generation cycle or operate cycle, these voltage conditions are not altered because the probe pulse is manually switched away from Q71, Q72, Fig. 11, and Q73, Q74, Fig. 12. However, during the check cycle, the probe pulse is switched, through the switch S4 of Fig. 11, to flip-flop Q71, Q72 and Q73, Q74. The anode of diode 220 of Fig. 11 is —20 volts for any character other than carriage return read by the #2 pins. The probe pulse (the end of the Operate pulse) appearing through the differentiating circuit at the anode of diode 220, has no effect because of this negative bias. When carriage return is read, the anode of diode 220 goes to ground through 44K ohms.

At the time carriage return is being read, the first check character is under the #1 pins and it must be introduced to just the first four stages of the 8-stage counter. At the end of the Operate pulse, when the first check character is placed into buffer storage, flip-flop Q71, Q72 is set. This causes the anode of diode 93 of Fig. 8 to be —20 volts. Since the check characters that were generated were forced to have the #3 pulse marking, the output of flip-flop Q17, Q18 in buffer storage, during the insertion of the check characters into the counter, has no significance so far as the addition of the check characters to the binary sum. Therefore, the output of flip-flop Q17, Q18 is neglected by making the anode of diode 93 go to —20 volts.

During the cycle after flip-flop Q71, Q72 has been set, the first check character is read out of buffer storage into the first four stages of the counter. The anode of diode 222, Fig. 12, is now at ground because diode 143 of Fig. 7 is no longer conducting. Therefore, at the next end of the operate pulse when the second check character is placed into buffer storage, flip-flop Q73, Q74 is set. The collector of transistor Q73 going to —20 volts puts this collector voltage through 22K ohms at the anodes of diodes 89, 91, 87 and 85. The collector of Q74 going to ground puts this zero voltage through separate 22K ohms at the anodes of diodes 98, 100, 96 and 94, Fig. 8. During the cycle after flip-flop Q73, Q74 has been set, the second check character is read out of buffer storage, but is placed into the second four stages of the 8-stage counter; the output of flip-flop Q13, Q14 is steered through diode 98 into the seventh stage; the output of flip-flop Q15, Q16 through diode 100 into the eighth stage; the output of flip-flop Q19, Q20 through diode 96 into the sixth stage; and the output of flip-flop Q21, Q22 through diode 94 into the fifth stage. The sum of an unerrored block plus its complement should cause each stage of the 8-stage binary counter to be set to "1." If this situation prevails, diodes 84, 86, 88, 90, 92, 95, 97 and 99, will not conduct.

With the collector of transistor Q73, Fig. 12, at —20 v., diode 225 does not conduct. At the beginning of the next first half of the Operate pulse after the second check character has been placed into the second four stages of the 8-stage counter, diode 226 stops conducting. This puts —20 v. through 27K ohms at the cathodes of diodes 84, 86, 88, Fig. 7, 90, 92, 95, Fig. 8, 97, 99, Fig. 9, and 225 and 226, Fig. 12. When this negative voltage is generated, the one-shot multivibrator comprising transistors Q79, Fig. 11, and Q80, Fig. 12, is triggered off. Transistor Q79 of this one-shot multivibrator is normally conducting while transistor Q80 is normally off. When this negative voltage is generated, diode 224 of Fig. 12 conducts and transistor Q80 goes to conduction. This positive change is coupled through a capacitor and turns transistor Q79 off. Transistor Q79 will stay nonconducting for a time determined by a 50K ohm potentiometer P1 in the base of transistor Q79. This time can be set from a minimum of 3.75 milliseconds to a maximum of 16.2 milliseconds. While transistor Q80 of the one-shot multivibrator is conducting and transistor Q79 is nonconducting, the next end of the Operate pulse is derived. Because the anode of diode 223 of Fig. 12 is ground through a 47K ohm resistor R8 to the collector of transistor Q74 and diode 215 is conducting, the flip-flop Q73, Q74 resets. A positive pulse is derived from the collector of Q73, and this positive pulse resets the flip-flop Q71, Q72. When these two flip-flops reset, the steering diode circuits are brought back to their original condition and the 8-stage counter is reset through a capacitor and diode 159, Fig. 9. If the comparison was correct, the one-shot multivibrator would have been activated, causing the anode of diode 219, Fig. 11, to be negative. When flip-flop Q71, Q72 is reset, a positive pulse is derived from transistor Q71, but this pulse does not cause diode 219 to conduct because its anode is −20 v. through resistors R9 and R10 which insert 104.7K ohms resistance. The condition of the one-shot multivibrator is also gated into the thyratron VT9 of Fig. 12 through diode 227. If the one-shot multivibrator has been triggered off, diode 227 conducts, causing the grid to remain negative even though diode 228 stops conducting momentarily when flip-flop Q71, Q72 resets.

Tube VT9 drives, over conductor 74, the "incorrect" marking mechanism of the tape marking device shown on Figs. 25 and 26. When transistor Q79 of the one-shot multivibrator returns to ground potential, a positive pulse is derived over the grid of tube VT10 causing it to fire. This tube drives, over conductor 75, the "correct" marking mechanism of the tape marking device. If one or more stages of the eight stages in the counter are in the reset condition following the insertion of the second check character, the diode (or diodes) associated with the stage (or stages) will conduct. Any one or more of diodes 84, 86, 88, 90, 92, 95, 97 and 99, Figs. 7 to 9, conducting will cause the ground or zero potential to remain at the cathodes of diodes 225 and 226 of Fig. 12, even though transistor Q73 is cut off, and the first half of the Operate pulse is derived. Because of this zero potential, no negative signal is introduced to the one-shot multivibrator and it does not switch. Therefore, diode 227 does not conduct, and diode 228 stops conducting when flip-flop Q71, Q72 of Fig. 11 resets. This causes tube VT9 to fire, activating the "incorrect" marking mechanism of the tape marking device. When flip-flop Q71, Q72 resets, another positive pulse is derived at the anode of diode 219 of Fig. 11. The anode of this diode was at ground through a 100K ohm resistor R9 because transistor Q79 did not switch. Therefore, diode 219 conducts when flip-flop Q71, Q72 resets, and the output of this diode whose cathode is connected to the base of transistor Q67 through the stop terminals (terminal 2 connected to terminal 1) of the switch S2 of Fig. 10, causes flip-flop Q67, Q68 to switch. Transistor Q67, which was on ground potential, is now at a negative potential, and this causes diode 183 to stop conducting and diode 184 to conduct. Diode 184 conducting, over conductor 49, causes the anode of diode 250 of Fig. 3 to be negative, which in turn causes the pulse generator to stop.

When flip-flop Q67, Q68 switches, a positive pulse is derived from the collector of transistor Q68 and this pulse causes the grid of thyratron VT11 of Fig. 11 to go positive. The plate circuit of the thyratron includes a buzzer in parallel with a resistor R11 to +120 v., Fig. 10, through the stop buzzer switch S5 and the reset switch S6. The resistor R11 allows the tube to remain fired while the buzzer operates; the stop buzzer switch S5 restores the thyratron VT11 to the unfired condition by removing the +120 v. for a short period of time. The reset switch S6 also extinguishes tube VT11 by removing +120 v. In review, an all set "1" condition of the 8-stage binary counter causes thyratron VT10 of Fig. 12 to fire, which over conductor 75 marks the tape as being correct. One or more stages of the binary counter in the reset condition causes thyratron VT9 to fire, which over conductor 76 marks the tape as being incorrect, and switches flip-flop Q67, Q68 which stops the system and fires thyratron VT11, causing the warning buzzer to sound. The throwing of the reset switch extinguishes thyratron VT11 and causes diode 186 of Fig. 10 to conduct. This resets flip-flop Q67, Q68, allowing the system to restart and continue on the next block of data.

*Long block timer.*—The function of the long block timer is to guarantee the reading of an end-of-block (carriage return) within a predetermined time. The timer comprises flip-flop Q61, Q62 of Fig. 9, the one-shot multivibrator comprising transistors Q63, Q64, Q65 and Q66, Fig. 13, read-out transistor Q91, Fig. 9, and flip-flop Q69, Q70, Fig. 10. Flip-flop Q69, Q70 switches (Q69 going from conduction to nonconduction) when the end-of-block is not read in the prescribed time. With the counter in the off position, transistor Q62 of flip-flop Q61, Q62, Fig. 9, is conducting to ground. This is the reset condition, and it causes diode 165 to conduct. The ground appearing at the cathodes of diodes 165 of Fig. 9, and 166 of Fig. 13, keeps transistor Q91 nonconducting. Transistor Q91 nonconducting applies −20 v. through 57K ohms at the anode of diode 187, Fig. 10, thereby preventing flip-flop Q69, Q70 from switching. When the counter is off, transistor Q64, Fig. 15, of the one-shot multivibrator is conducting because its base is supplied with −15 v. through a 22K ohm resistor and the 50K potentiometer P2. If transistor 64 is conducting, transistor Q66 is cut off and the emitter potential of transistor Q65 is also at a negative potential. When Figs, A, Ltrs, is read, a positive pulse is derived from the collector of transistor Q50. This positive pulse is gated into diodes 173, Fig. 12, and 180, Fig. 13, and causes them to conduct because their anodes had been at ground through 100K ohms. When diode 173 conducts, flip-flop Q61, Q62 switches causing transistor Q62 to be cut off. When diode 180 conducts, the one-shot multivibrator is triggered off causing transistor Q64 to be cut off, transistor Q66 to be at ground potential, and the emitter of transistor Q65 to be at ground. Now diode 166 of Fig. 13 is conducting (diode 165, Fig. 9, no longer conducts) causing a ground to continue to appear at the cathodes of diodes 165 and 166. This ground continues to keep transistor Q91 nonconducting.

If the selector switch S4 of Fig. 11 is in the "operate" position, i.e., when it is thrown upwardly, flip-flop Q75, Q76 switches when carriage return is read. This causes a positive pulse to be derived at the anode of diode 171 of Fig. 12. The anode of this diode had been at ground through 100K ohms. This positive pulse causes the diode 171 to conduct, switching flip-flop Q61, Q62. When the collector of transistor Q61 goes negative (Q61, Q62 resetting) transistor Q63 conducts and momentarily clamps a ground through diode 167 on the collector of transistor Q64. This ground resets the one-shot multivibrator because transistor Q64 is at ground, transistor Q66 is nonconducting, and the low-output impedance emitter follower Q65 has caused a negative pulse to be coupled through a capacitor to the base of transistor Q64 causing Q64 to conduct. This cycle has not altered the output of transistor Q91; it is still −20 volts because either diode 166 or 165 is conducting.

Two character cycles later, flip-flop Q75, Q76 resets, causing transistor Q75 to change from −20 volts to ground. This causes diodes 174, Fig. 12, and 179, Fig. 13, to conduct, which sets flip-flop Q61, Q62 and it triggers the one-shot multivibrator. Flip-flop Q61, Q62 and the one-shot multivibrator will continue to perform this cycle so long as the counter is in the "on" condition and the #2 pins of the transmitter read the carriage return. The setting of the variable 50K potentiometer P2 in conjunction with the 22K ohm resistor R7 and the 100-μf. capacitor C7, which art located in the base circuit of transistor Q64, is determined by the length of the block to be timed. With operation at 200 words per minute, one block of information which is equal to the usual teleprinter line in the number of characters, requires about 3 seconds of transmission time. The range of the timer setting is from 2.2 seconds to 7.2 seconds. The timer is actually set for about 4.5 seconds since this will take care of blocks that have more than the normal or average number of Figs and Ltrs shift. If a carriage return is not read 4.5 seconds after the reading of Figs, A, Ltrs, or 4.5 seconds after flip-flop Q75, Q76 had been reset; transistor Q64 goes back to conduction, causing the output of the transistor Q66 to be negative. This causes diode 166 to stop conducting. Because diode 165 had not been conducting since the beginning of this block, the cathodes of diodes 165 and 166 are negative. This causes transistor Q91 to conduct, placing ground through 47K ohms at the anode of diode 187 of Figs. 10.

At the next probe pulse over conductor 50, which in time is at the end of the No. 1 pulse but derived from the same source as the pulse which fires thyratron VT2 of Fig. 4, flip-flop Q69, Q70 switches. This causes flip-flop Q67, Q68 to switch because a positive pulse is derived from the collector of transistor Q70 and is coupled through diode 185 of Fig. 10 to the base of transistor Q67. When flip-flop Q67, Q68 switches, the system is stopped as previously described and thyratron VT11 which operates the buzzer, fires.

The operation procedure now is to manually move the tape in the transmitter until the next carriage return is placed over the #2 pins. Assuming that an error was made in the preparation of this tape omitting end-of-block, the block that immediately follows the resultant "long block" should contain wrong check characters so that this error may be indicated. Therefore, by placing the following carriage return over the #2 pins and depressing the reset switch S6 of Fig. 10, flip-flop Q67, Q68 is reset and the buzzer is disengaged. At the same time, diode 186 conducts to reset flip-flop Q67, Q68 and diode 233 conducts, causing a ground potential to appear at the cathodes of diodes 233, 229, 230 and 37 Fig. 3. This ground prevents tube VT2 of Fig. 4 from firing thereby preventing the transmitter from stepping (tube VT1 being fired keeps the magnet *m* energized) with the pins spacing. When the pulse generator goes through its first complete cycle, the flip-flops Q13 to Q22 of buffer storage are reset and are not set again because the selection in the #1 pins is spacing. At the same time, the reperforator is running and feeding out blanks. When the reset switch was depressed, diode 35 of Fig. 10 went from conduction to nonconduction, assuming that the counter was on and transistor Q49 of flip-flop Q49, Q50 was nonconducting thereby causing diode 234 to be nonconducting.

When the reset switch S6 of Fig. 10 is allowed to return to its home position, a positive pulse is derived at the anode of diode 188 and this pulse resets flip-flop Q69, Q70. The reset switch upon returning to its home position also permits diode 35 to conduct, thereby changing its cathode potential from −20 v. to ground. This positive change, over conductor 133, is coupled through two capacitors to the anodes of diodes 172, Fig. 12, and 178, Fig. 13. This causes the one-shot multivibrator to restart, which removes a ground pedestal at the anode of diode 187, Fig. 10, of flip-flop Q69, Q70. However, it does not reset flip-flop Q61, Q62 which therefore remains in the set condition, and the one-shot multivibrator remains in its triggered condition. Thus, timing of the next block of data is initiated. When flip-flop Q69, Q70 switches, transistor Q70 goes from ground to −20 v. This negative change is coupled through a capacitor to diode 157 of Fig. 9 causing transistor Q48 to conduct and the counter is reset. As soon as the reset switch has returned to its home position, the clamp over conductor 50 to the grid of thyratron VT2, Fig. 4, through diode 233 of Fig. 10, is removed, allowing the transmitter step magnet to be released when the end of the first pulse is generated by the pulse generator. The first character to be read by the #2 pins is the carriage return that had been physically placed over them. At the reading of this carriage return, control circuits which cause generation of the check characters are activated. However, because the counter had been reset, the check character generated will be all "ones." Therefore, the block following the long block consists of carriage return, Ltrs, Ltrs. When this block is checked it will be detected as wrong because the sum of the block plus the check characters will not equal an all "1" condition in the binary counter.

Before the autostop switch S1, Fig. 10, was thrown to the off position (the tongue, terminal 2, in contact with terminal 3) and assuming the binary counter is on (the collector of transistor Q49 being at −20 v.), terminal 3 assumes a charge of −20 v. through a resistance of 100K ohms. When the autostop switch is thrown to the off position, terminal 3 becomes ground. This positive change over conductor 254 is coupled to a capacitor which causes diode 170 of Fig. 12 to conduct. This resets flip-flop Q61, Q62 which in turn stops the one-shot multivibrator. At this time the cathode of diode 189 becomes −20 v. from the collector of transistor Q49. When the autostop switch is thrown to the left to its "on" position, the cathode of diode 189 of Fig. 10 becomes ground, and this positive change over conductor 136 is coupled through a capacitor to diodes 176, 177, Fig. 13, causing these diodes to conduct. When they conduct, flip-flop Q61, Q62 is set, and the one-shot multivibrator is triggered off and resumes its cycle.

When Figs, A, F, Ltrs is read, the timer is shut off by coupling the positive going change derived from the collector of transistor Q49 of Fig. 6 into diode 169 of Fig. 12, causing it to conduct. When this diode conducts, flip-flop Q61, Q62 is reset, and it stops the one-shot multivibrator and the timer is now deactivated.

When the selector switch is downward in its check position, the timer is started by Figs, A, Ltrs, as before, and it is deactivated by Figs, A, F, Ltrs as before. In the instant arrangement the use of the letter H, which may be read by the matrix of Fig. 5, is not required. After the counter is on and carriage return is read, a positive pulse is derived from the collector of transistor Q72 of flip-flop Q71, Q72, Fig. 11, and this positive pulse causes diode 168 of Fig. 12 to conduct. When 168 conducts, flip-flop Q61, Q62, Fig. 9, is reset, which in turn stops the one-shot multivibrator. If the correct sum is derived after insertion of check characters, the collector of transistor Q79 of Fig. 11 will switch from ground to −20 v. back to ground. When transistor Q79 goes from −20 v. to ground, the cathode of diode 218 of Fig. 11 goes from ground to +20 v., and this positive pulse is coupled into diodes 175 of Fig. 12 and 176 of Fig. 13, causing them to conduct, and flip-flop Q61, Q62 is set and the one-shot multivibrator is triggered off. This procedure is followed at each correct block.

If an incorrect sum is derived after the insertion of check characters, the collector of transistor Q79 will not change in voltage. However, when flip-flop Q71, Q72 resets, diode 219 of Fig. 11 conducts. If the switch S2 is in the nonstop on error position (terminal 2 connected to terminal 3), the positive pulse derived from diode 219 conducting is coupled into diodes 175, 176 causing them to conduct. This pulse sets the flip-flop Q61, Q62, and triggers the multivibrator. If the switch is in the stop on error position (terminal 2 connected to terminal 1) the positive pulse derived through diode 219 of Fig. 11, over conductor 236, causes flip-flop Q67, Q68 to switch. This stops the system. When the reset switch is operated, diode 35, Fig. 10, which was conducting, stops, causing the cathodes of diodes 35 and 234 to be negative (assuming that transistor Q49 of Fig. 6 is off). When the reset switch is allowed to return to its home position, the cathodes of diodes 35, 234 return to ground, and this positive change over conductor 133 is coupled through diodes 172 of Fig. 12 and 178 of Fig. 13 to set the flip-flop Q61, Q62 and trigger the multivibrator.

If the autostop switch S1 is thrown from on to off or from off to on, and the 8-stage binary counter is off, no pulse will be derived to affect the timer. Likewise, when the reset switch S6 is depressed, no pulse will be derived to affect the timer. This is due to the fact that the collector of transistor Q49 is at ground potential, and this prevents the appearance of any changes in potential on any of the timer input circuits.

*Detailed description of receiving apparatus*

Figure 14:
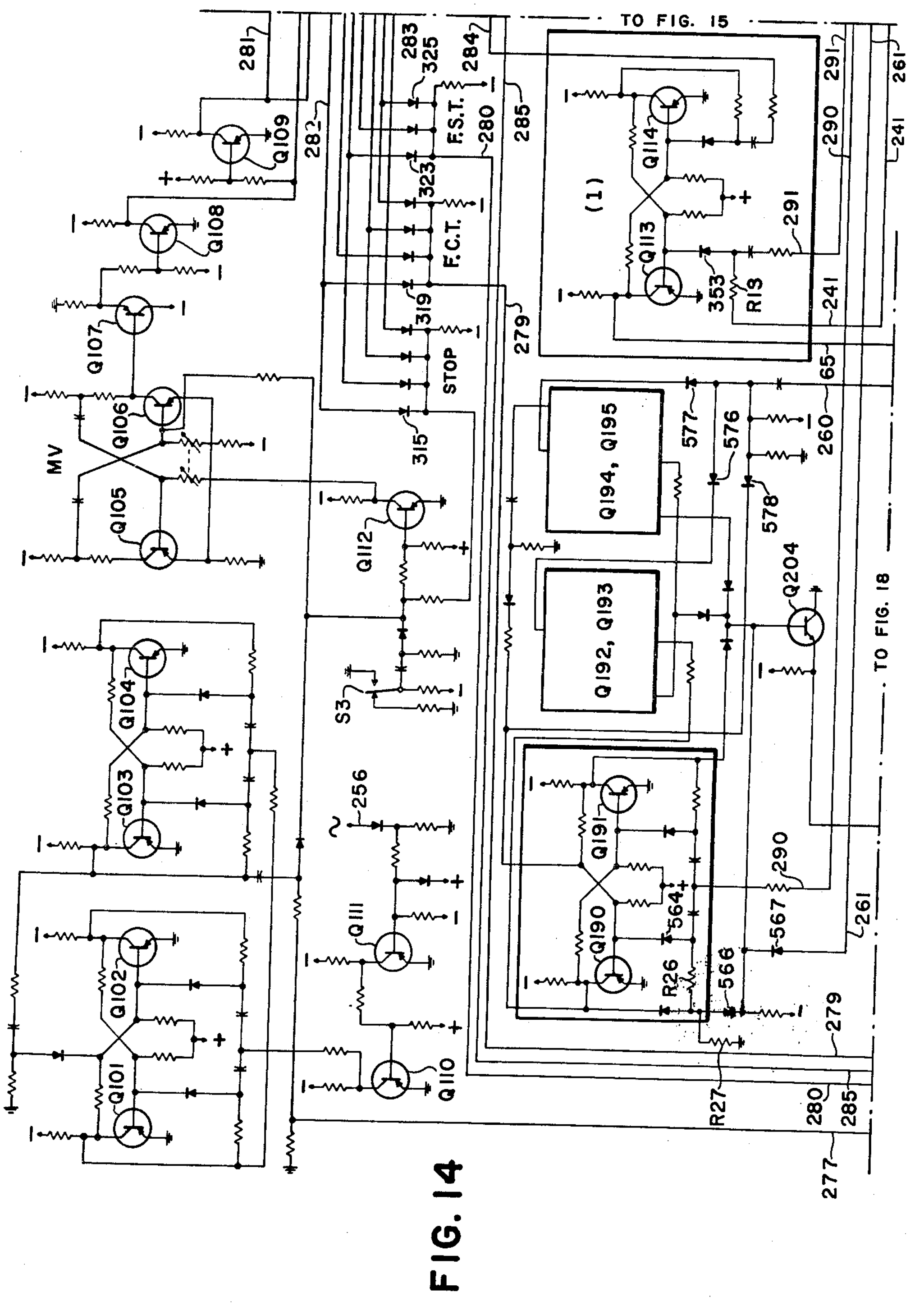
Figure 15:
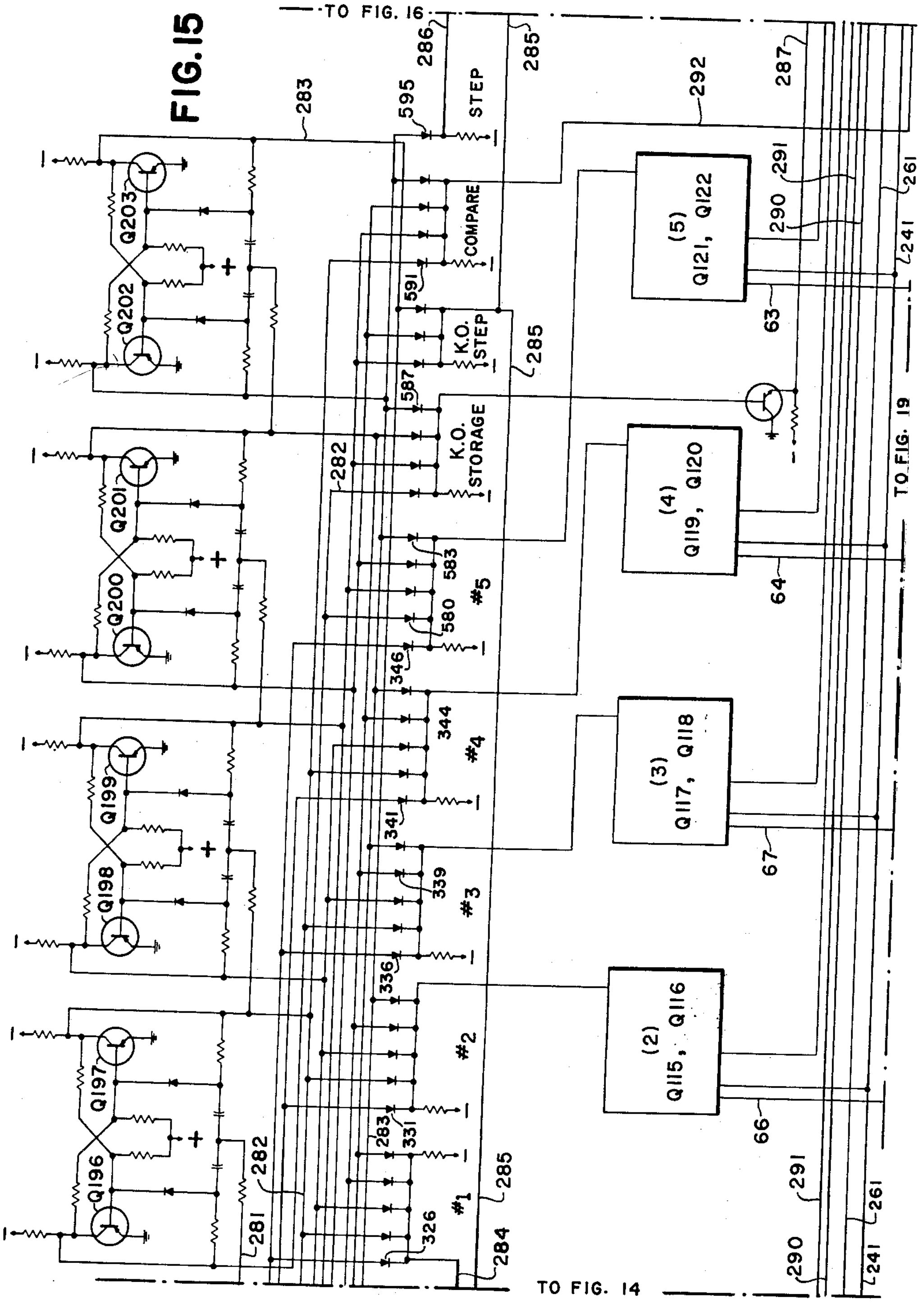
Figure 16:
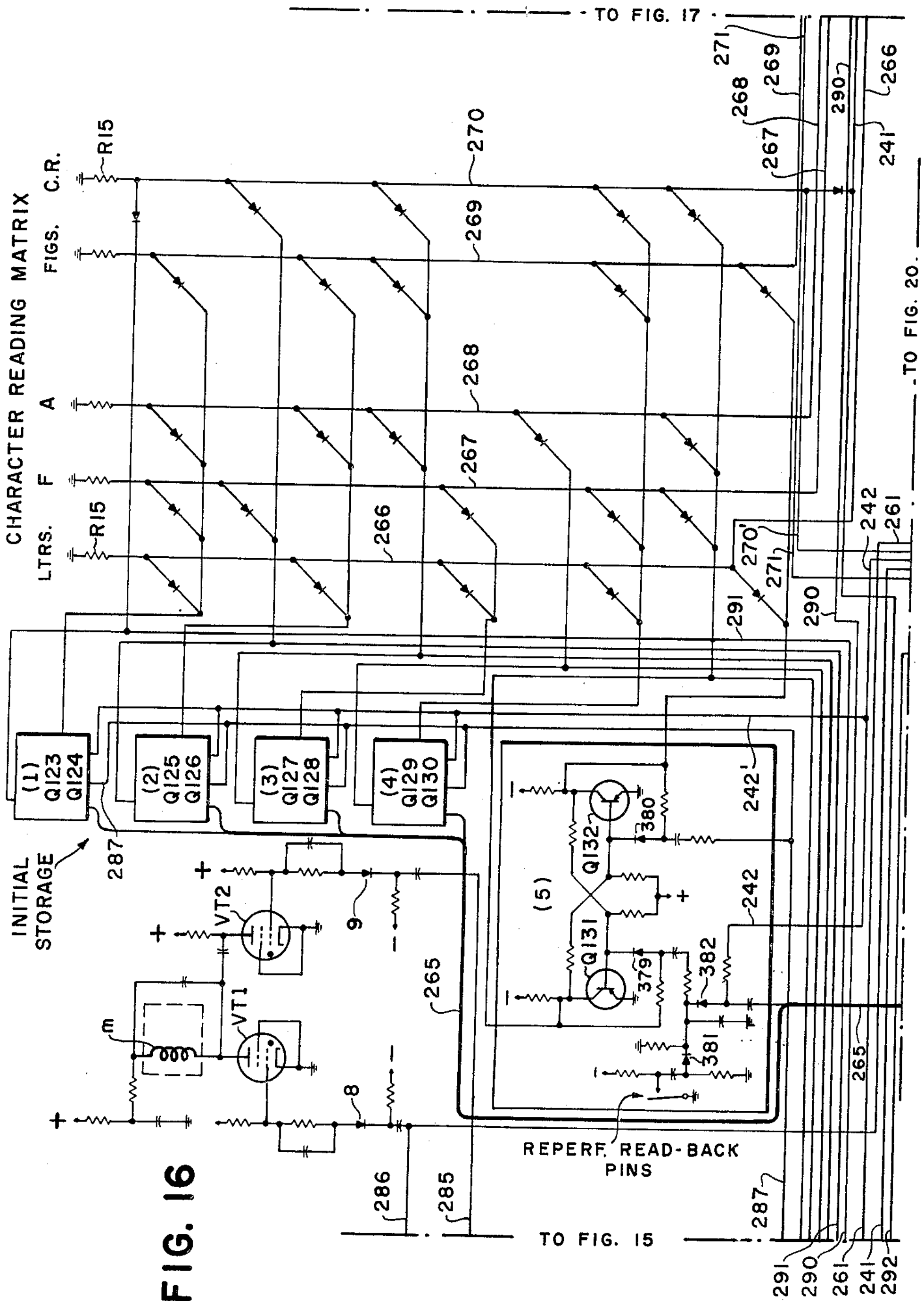
Figure 17:
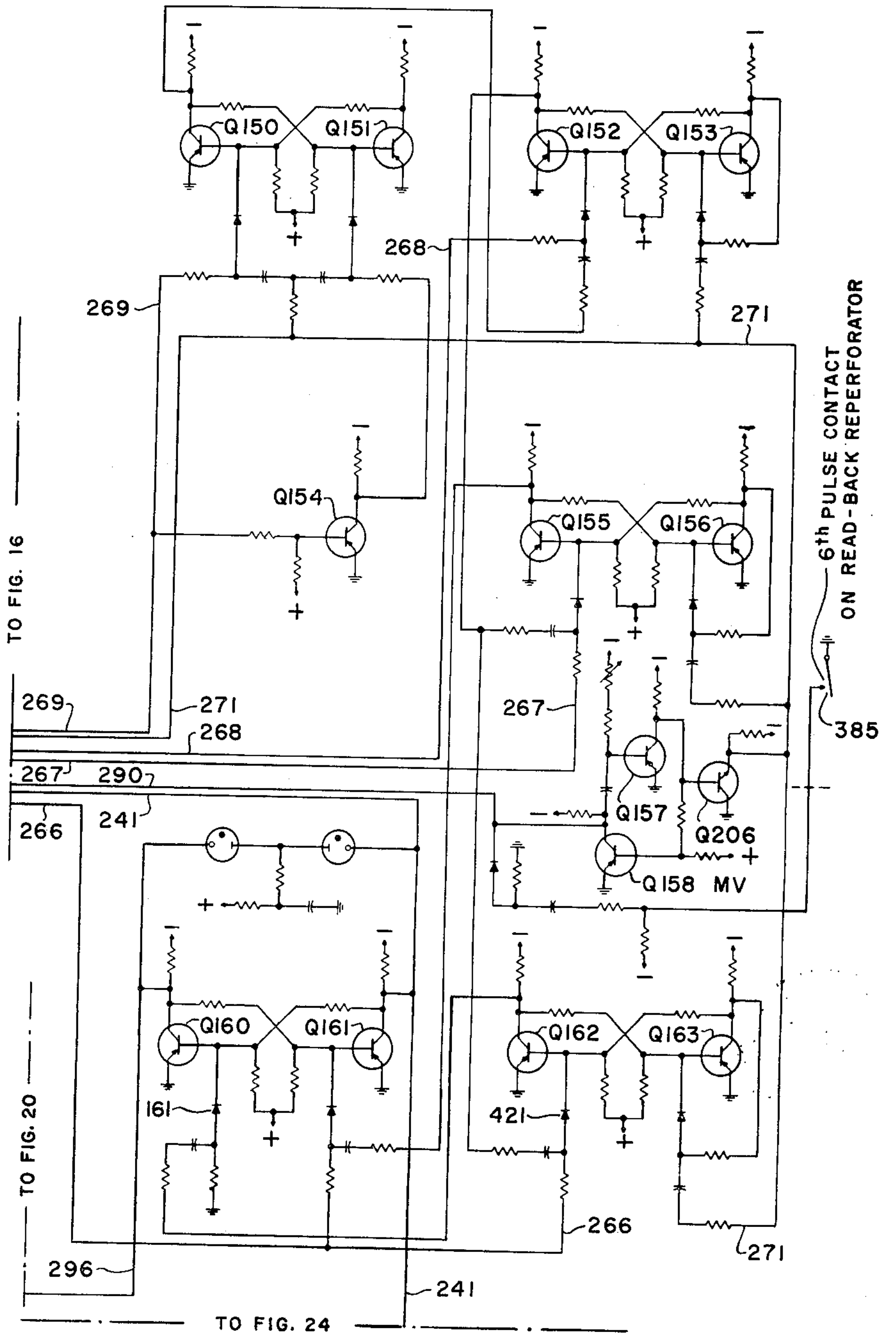
Figure 18:
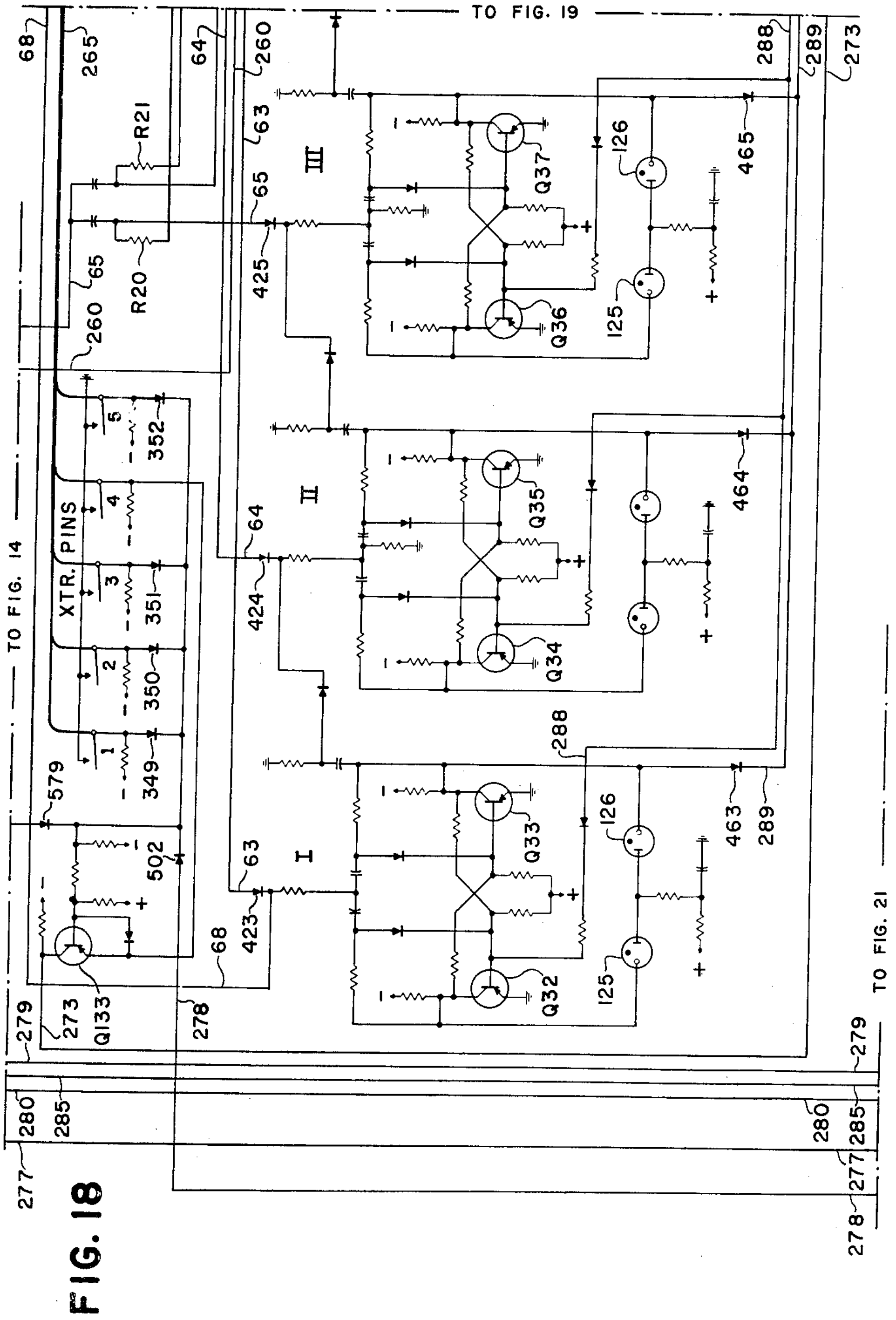
Figure 19:
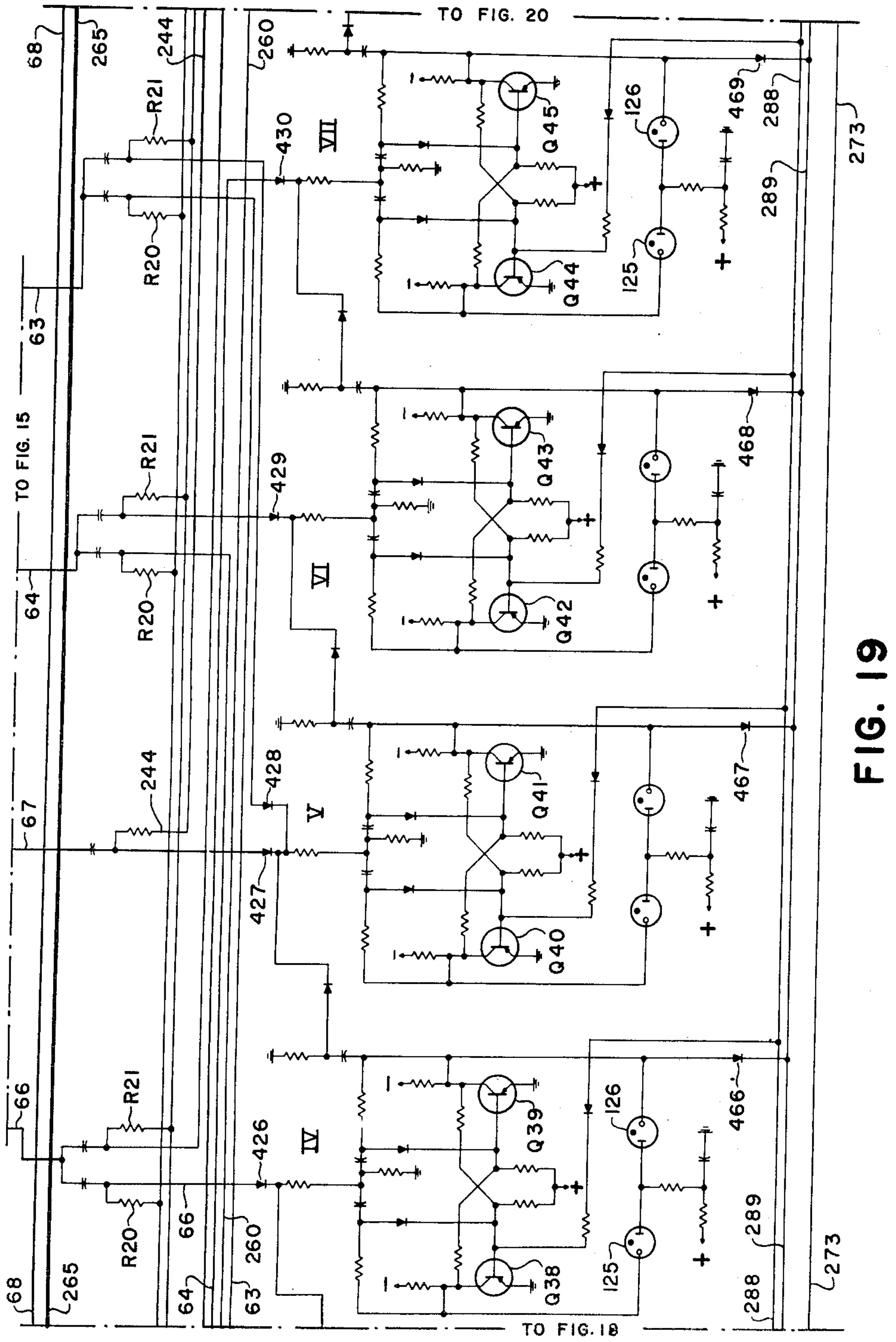
Figure 20:
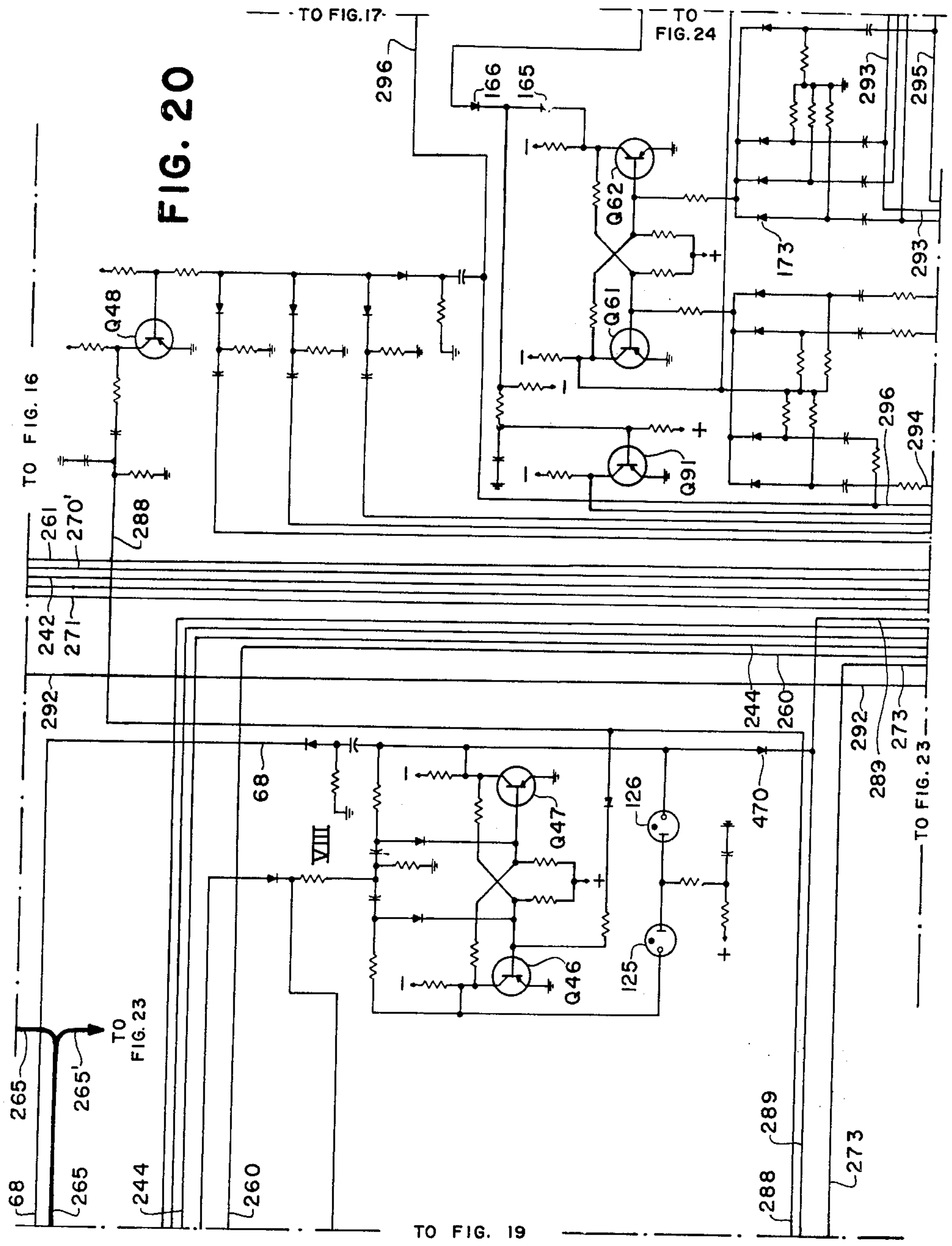
Figure 21:
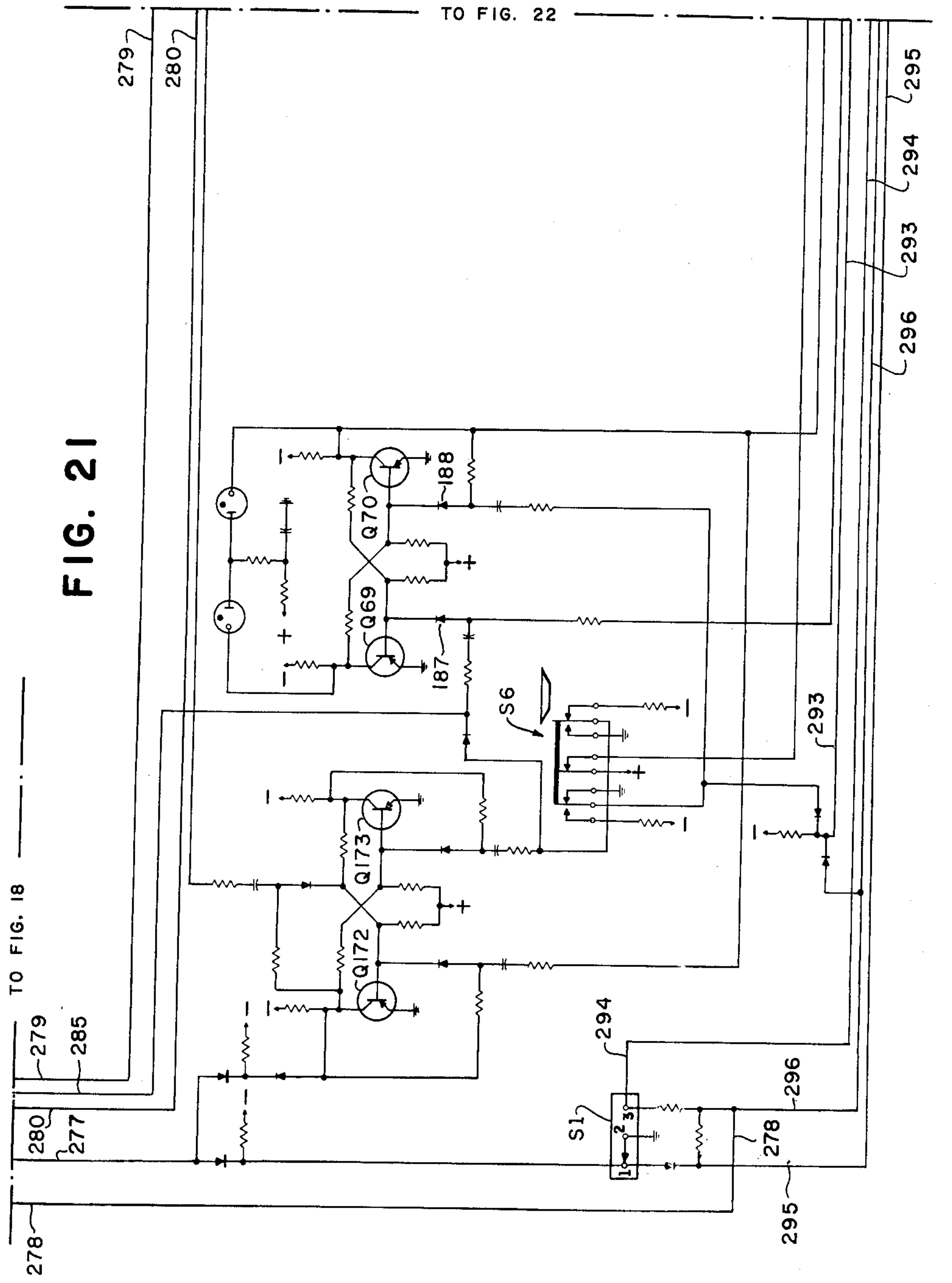
Figure 22:
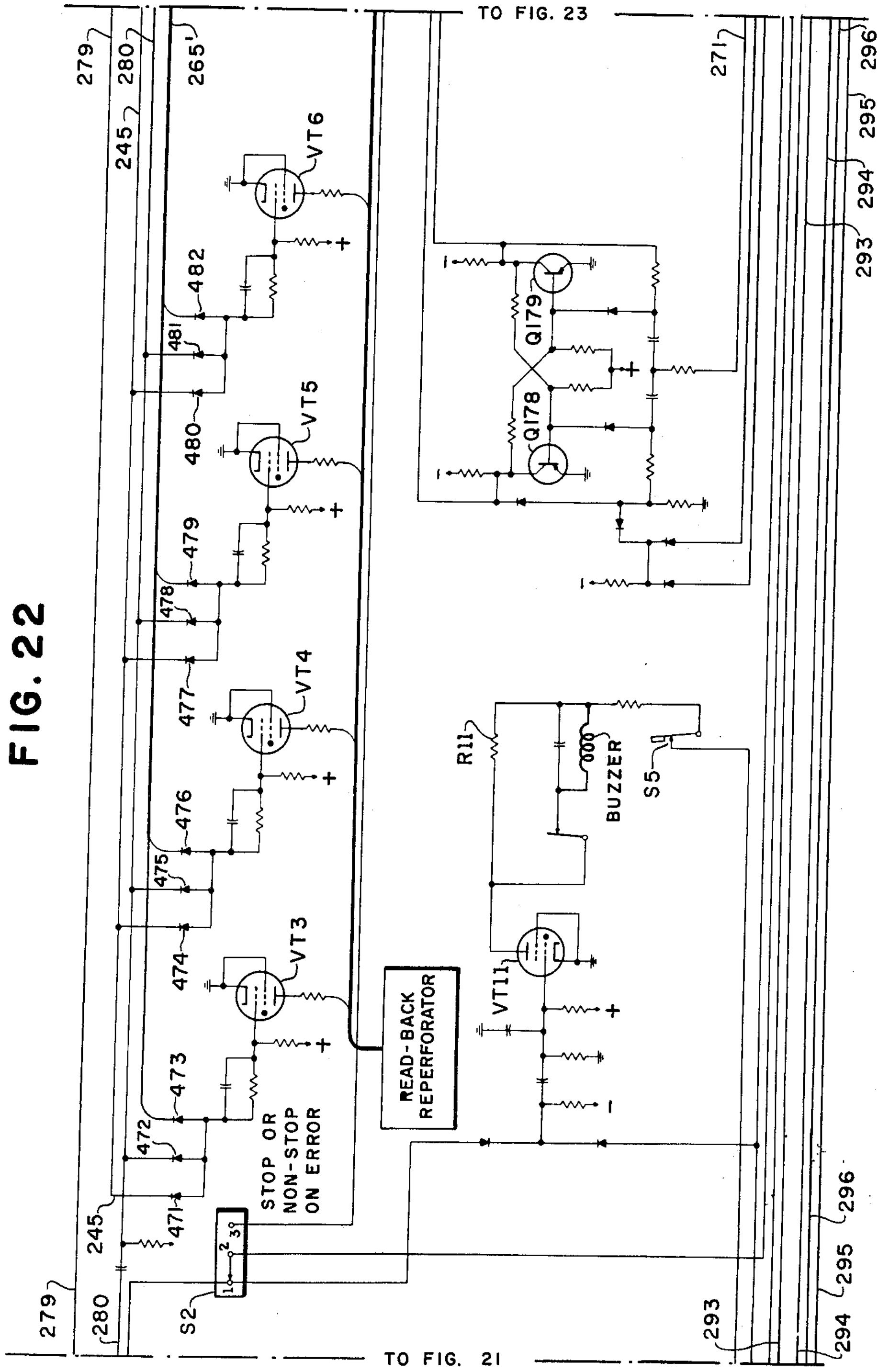
Figure 23:
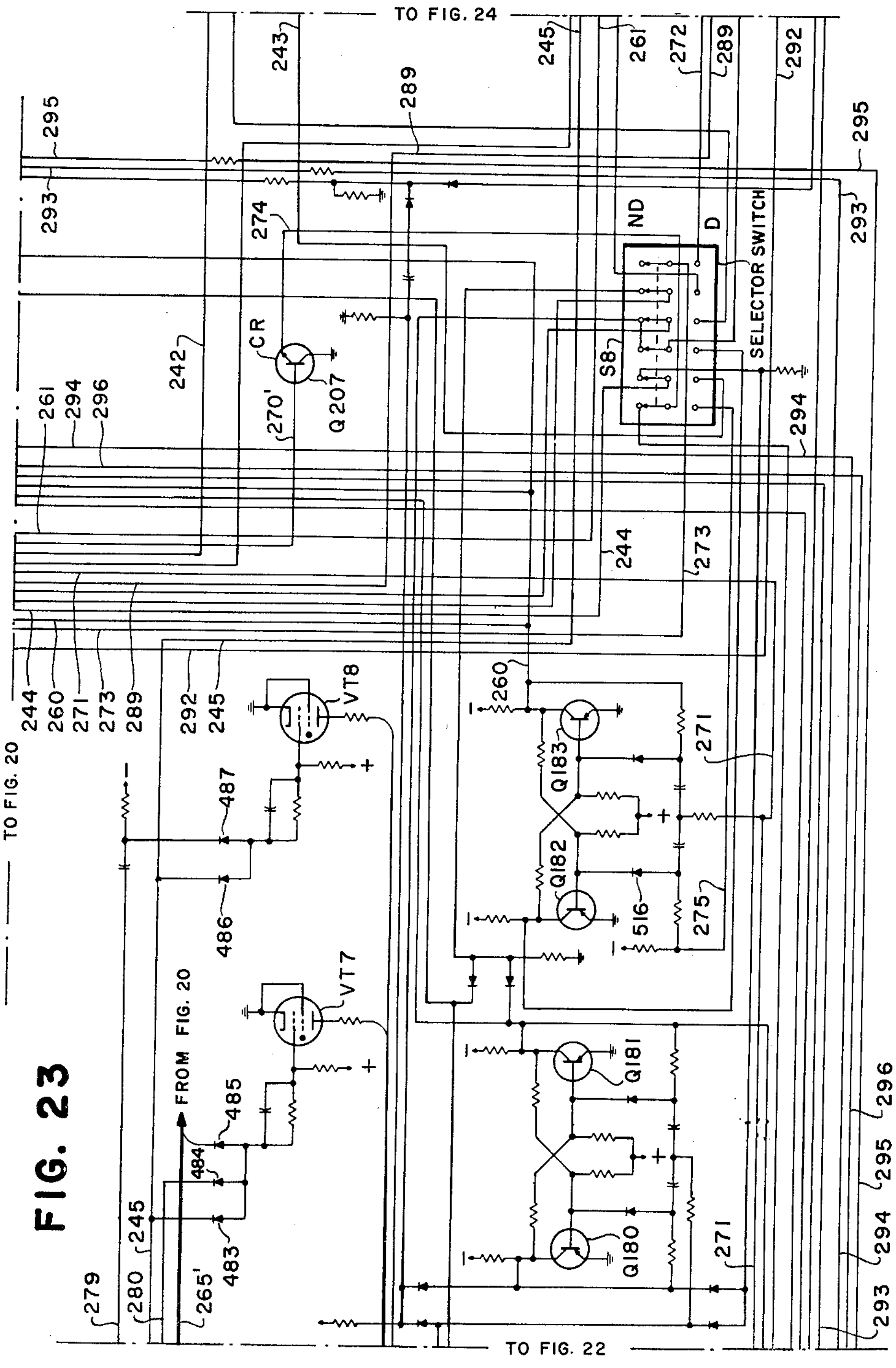
Figure 24:
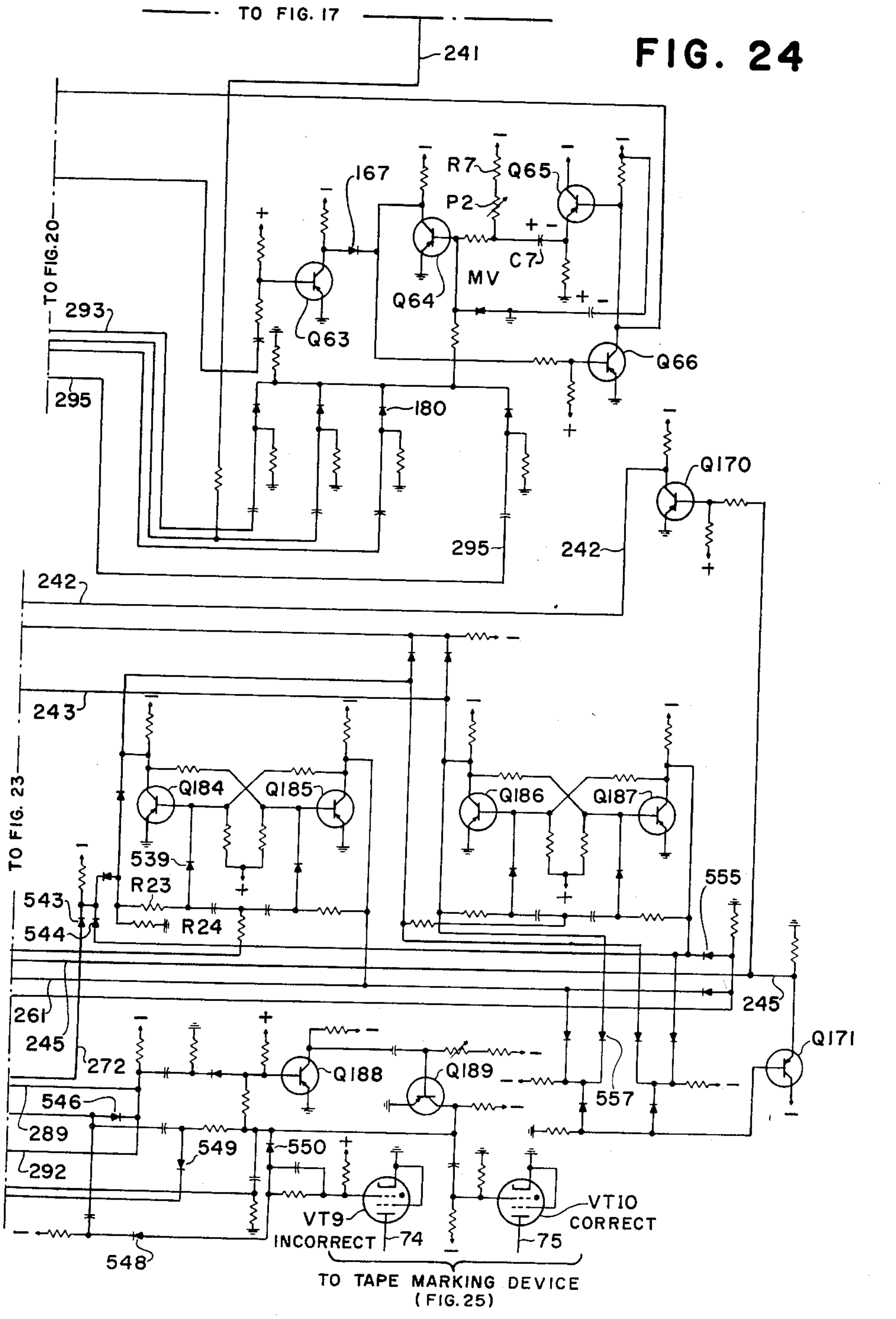

Figs. 14 to 24, inclusive, when arranged with respect to each other in the manner indicated in Fig. 28, show the various circuit details involved in the receiving end. In this group the units are shown generally on the different figures as follows: Fig. 14 shows a drive and pulse generator and stage (1) of buffer storage. Fig. 15 shows a four-stage binary counter for producing a binary count, and an associated diode decoder. Fig. 16 shows initial storage flip-flop stages and a character reading matrix. Fig. 17 shows a sequential character reading network. Fig. 18 shows a carriage return reading circuit associated with the transmitter. Figs. 18, 19 and 20 show an eight-stage binary counter for error checking purposes, and Fig. 20 also shows a portion of a "long block" timer circuit. Figs. 21 and 24 show other units of the "long block" timer circuit. Figs. 22 and 23 show thyratron circuits for controlling the read-back reperforator.

The processed tape containing check characters that has passed through any number of switching centers of a telegraph system is received at the receiving end on a conventional type of reperforator. It is then presented to the receiving circuit equipment of the off-line error detection system. When Figs, A, Ltrs is read by the read-back pins of the 28 reperforator (diagrammatically shown in Figs. 2 and 22), the read-back pins of which are indicated at the lower lefthand portion of Fig. 16, the binary counter is switched on and reset, carriage return read circuits are allowed to function, and the long block timer is activated. This timer corresponds to and functions in the same manner as the long block timer at the sending end. It resets when a carriage return is read and sets on the next cycle. In this manner each block of data is timed until the combination of Figs, A, F, Ltrs is read by the reperforator read-back pins, and when this occurs the timer is deactivated.

During normal operation the selection that is read by the transmitter (whose step magnet *m* is shown in Fig. 16 and its reading pins shown in Fig. 18) is transferred to the read-back reperforator by means of the thyratrons of Figs. 22 and 23. The characters that are punched by the reperforator are read five characters later by the read-back pins, and this reading is probed for the control characters. Following the reading of the sequence Figs, A, Ltrs, all characters read by the read-back pins are placed into the 8-stage binary counter of Figs. 18 to 20 with the tape level-to-binary counter assignments the same as hereinbefore outlined for the sending end of the system. When carriage return CR is read by the transmitter, the reperforator is stopped and the next two characters read by the transmitter are placed only into the 8-stage binary counter, which two characters are the check characters. After the check characters are read by the transmitter, the reperforator is once again allowed to operate. However, the last character punched was the carriage return and it must receive five more characters before this carriage return appears over the read-back pins. When carriage return is read by the reperforator, it signifies the end of a block of data.

After the binary value of carriage return is placed into the 8-stage counter, the counter is scanned and if a "1" condition exists in all the stages, the block of data is correct and the marking device shown in Figs. 23 and 24 marks the punched tape coming out of the readback reperforator with a black line. If any one stage or more than one stage of the counter is in the "0" condition, the block of data is incorrect and the marking device marks the tape with a red line, as hereinbefore stated. This procedure of checking continues until the combination Figs, A, F, Ltrs is read, which indicates the end of the data to be checked. At this time the carriage return is not allowed to be read by either the transmitter or the reperforator, in which case no checking is performed.

By throwing the selector switch S8 of Fig. 23 from its delete (D) to non-delete (ND) position, checking of of the tape still occurs but the transmitter does not recognize carriage return, and therefore the check characters are not deleted from the final tape. As seen in Fig. 23, the selector switch S8 is shown in the non-deleting position.

*Pulse generator, binary counter, and decoding*

A 2-stage counter shown in Fig. 14 is utilized, as in the sending end of the system, to generate a 20-cycle sync pulse from a 60-cycle source 256. This sync pulse allows the astable multivibrator, composed of transistors Q105, Q106 to run. The astable multivibrator stops at the end of each cycle and awaits the sync pulse from a transistor Q101, which procedure was explained in detail in the description of the sending end. Transistors Q107, Q108 and Q109 of Fig. 14 amplify the output of transistor Q106 and present the drive pulse to a 4-stage binary counter with no feedback. This counter, composed of flip-flops Q196, Q197, Q198, Q199, Q200, Q201, and Q202, Q203, seen in Fig. 15, is utilized to generate a binary count that varies with time to provide a distribution of time pulses for the system. Diodes 315 through 346 and 580 through 595, Figs. 14 and 15, decode the binary count to actual time pulses. The pulses derived from these diode gates, as indicated by the legends, are: Stop, F.C.T. (fire clutch thyratron), F.S.T. (fire selector thyratron), #1, #2, #3, #4, #5, KO (knock-out) Storage, KO (knock-out) Step, Compare, and Step.

*Character storage from reperforator with reading matrix and sequential character recognition.*—Fig. 16 shows five stages (1) to (5) of initial storage, stage (5) being shown in detail, and the preceding stages corresponding thereto. It will be understood that the appropriate conductor in cable 265 from the transmitter pins 1 to 5 of Fig. 18 extends to the corresponding initial storage unit (1) to (5), and also that the five reperforator read-back pins respectively are connected to the five storage units in the manner shown in detail in stage (5). The anode of one of the diodes in each of these units, such as the diode 382 seen in stage (5), is normally negative, thereby preventing the characters being read from the transmitter from altering the stage of flip-flops Q123, Q124, Q125, Q126, Q127, Q128, Q129, Q130, and Q131, Q132 which may be designated as the Initial Storage flip-flops.

The character being read by the reperforator read-back pins, diagrammatically indicated by the legend "Reperf. Read-Back Pins" in the initial storage unit (5), is introduced into these flip-flops in the units corresponding to diode 381, 379 seen in stage (5). The output of these five flip-flops are connected to a character reading matrix. The characters recognized by this matrix are Figs, F, A, Ltrs and CR. When any one of these characters is placed into initial storage, the appropriate reading bus bar 266, 267, 268, 269 or 270 will be at ground through a 22K ohm resistance R15. For any other character it will be −20 v. Flip-flops Q150, Q151, Q152, Q153, Q155, Q156, Q160, Q161, and Q162, Q163, along with transistor Q154, Fig. 17, constitute the sequential character reading network, which functions in almost exactly the same manner as in Fig. 6 of the sending end circuit. There are, however, two basic differences. In the receiving apparatus the probe pulse for the set side of these flip-flops is derived from the read-back reperforator over conductor 271. When the 6th pulse contact 385, seen at the right hand portion of Fig. 17, on the reperforator closes (this occurs at the exact time that the read-back contacts close), the positive pulse is coupled into a one-shot multivibrator MV comprising transistors Q158, Q157 and Q206. The positive going output pulse from the one-shot multivibrator, which is seen at the emitter of transistor Q206, Fig. 17, is delayed in time with respect to the closing of the sixth pulse contact 385 on the read-back reperforator. This enables the sequential reading flip-flop to be probed after the read-back selection has been stored in the initial storage flip-flops Q123–Q132 of Fig. 16.

The other basic difference is that the receiving unit character recognition network contains an extra flip-flop Q162, Q163, Fig. 17. After Figs and A have been read, the ground that appears if Ltrs is the next character is seen at the anode of diode 421, Fig. 17, or flip-flop Q162, Q163. At the next probe pulse from transistor Q206, the flip-flop Q152, Q153 resets and this causes flip-flop Q162, Q163 to set. The Ltrs of the combination Figs, A, Ltrs is still in initial storage, and it is not desired to add it into the 8-stage counter. Therefore on the next character after Ltrs of, Figs A, Ltrs (the first character of the block to be checked), flip-flop Q162, Q163 resets, which sets flip-flop Q160, Q161. This stage of the flip-flop Q160, Q161 corresponds to the 8-stage binary counter being on. The character that is in the initial storage flip-flops is then transferred to the buffer storage flip-flops at the end of the KO (knock-out) storage pulse because transistor Q161 of the flip-flop is conducting to ground and this ground, over conductor 241, appears through separate 47K ohm resistors such as the resistor R18, Fig. 14, of stage (1), and the corresponding resistors in the remaining stages (2) to (5), at the pedestal input of the set side of the buffer storage flip-flops. When Figs, A, F, Ltrs is read by the sequential character recognition network, flip-flop Q160, Q161 of Fig. 17 resets. This state corresponds to the eight-stage binary counter being off.

*Buffer storage and eight-stage binary counter input.*—Flip-flops Q113, Q114 to Q121 Q122 represent the buffer storage between the initial storage flip-flops and the eight-stage binary counter I to VIII, of Figs. 18 to 20. After Figs, A, Ltrs have been read, transistor Q161 of Fig. 17 is conducting. This places ground through the separate 47K ohm resistors R18 at the anode of the diode 353, Fig. 14, in stage (1) of buffer storage, and the corresponding diodes in stages (2) to (5) of the storage. When the initial storage flip-flops of Fig. 16 are reset at the end of the KO (knock-out) storage pulse, provided that they were set by a marking condition from the read-back pins of the reperforator, positive pulses are derived at the anodes of the foregoing diodes 353, which positive pulses switch the appropriate buffer storage flip-flops. At the end of the No. 1 pulse, flip-flop Q113, Q114, Fig. 14, is reset if it was set; at the end of the No. 2 pulse, flip-flop Q115, Q116, Fig. 15, is reset if it was set; at the end of the No. 3 pulse, flip-flop Q117, Q118 is reset if it was set; at the end of the No. 4 pulse, flip-flop Q119, Q120 is reset if it was set; and at the end of the No. 5 pulse, flip-flop Q121, Q122 is reset if it was set. The resetting of these flip-flops causes positive pulses to appear at the collectors of the transistors Q113, Q115, Q117, Q119 and Q121. These positive pulses are then steered, by conductors 63 to 67, into the appropriate stages of the eight-stage binary counter. This is accomplished by having ground through 22K ohm resistors R20 appearing at the anodes of diodes 423 to 427, and minus potential through separate 22K ohm resistors R21, Figs. 19 and 20, appearing at the anodes of diodes 428 to 431. These voltage bias conditions will not be altered until the check characters appearing at the end of each block of data are placed into the eight-stage binary counter.

The eight-stage binary counter is essentially the same as the one hereinbefore described for the sending end of the system, and the same reference characters generally are employed to identify corresponding elements of the counter. The counter is composed of flip-flops Q32, Q33, to Q46, Q47 respectively representing the eight stages I to VIII of the counter. However, there are no diodes associated with reading out from the reset side of each stage of the counter, since these diodes in the sending end were used only for generation of the check characters, and this is not a function of the receiving end and they are not included with the counter.

*Transmitter drive and reading of carriage return by the transmitter.*—The transmitter drive used in the receiving end is substantially identical to the one used in the sending end hereinbefore described. When thyraton VT1, Fig. 16, conducts, the step magnet *m* of the tape transmitter is energized; this occurs at the end of the step pulse. Thyratron VT1 conducting causes thyratron VT2 to extinguish, and when thyratron VT2 conducts, thyratron VT1 is extinguished. In this manner the transmitter is stepped along at the rate of one step per cycle of the pulse generator. If the eight-stage counter is in the "on" condition, diode 502 of Fig. 18 is nonconducting, and this permits the transmitter to read a carriage return. When CR is being read by the transmitter, diodes 349, 350, 351 and 352, Fig. 18, do not conduct and this allows minus potential to appear on the base of transistor Q133. At the same time, the ground that appears at the fourth level of the tape is gated into the emitter of the transistor Q133. Therefore, if number 4 pulse is marking and pulses 1, 2, 3 and 5 are spacing, the transistor Q133 will conduct to ground. Any other combination appearing at the transmitter read pins will cause the output of the transistor to be −20 v. When transistor Q204 of Fig. 14 conducts, its emitter will be at ground potential and this will prevent the carriage return from being read by the transmitter. The conditions that caused the transistor Q204 to go to conduction are set forth hereinafter in describing how the counter prohibits reading of the carriage return by the transmitter.

*Reperforator drive.*—Thyratrons VT3, VT4, VT5, VT6, Fig. 22, and VT7, VT8, Fig. 23, represent the drive for the selector magnets and clutch magnet, respectively, of the reperforator shown diagrammatically on Fig. 22. The cathodes of diodes 471, 474, 477, 489, Fig. 22, 483 and 486, Fig. 23, are normally at ground potential. This ground bias will not be altered until the check characters are inserted into the binary counter. At the end of the fire clutch thyratron pulse, diode 487, Fig. 23, ceases to conduct. This causes the grid of thyratron VT8 to rise above ground, and the thyratron fires. Diodes 473, 476, 479, 482, Fig. 22, and 485, Fig. 23, are employed to gate in the pulse code of the character being read by the transmitter pins, over cable 265′. If the appropriate selection is a space pulse, the corresponding diode will conduct, and if it is a mark pulse, it will cease to conduct. No matter what the code combination of the character is, however, the grids of thyratrons VT3 through VT7 will remain negative until the end of the fire selector thyratron pulse. At this time diodes 472, 475, 478, 481, Fig. 22, and 484, Fig. 23, will cease to conduct. When these diodes stop conducting, the selection that is being read by the transmitter is transferred to the read-back reperforator because the appropriate selector magnet thyratrons are fired.

*Checking with deletion of check characters*

In this case the selector switch S8 of Fig. 23 is thrown downward to its deletion position D. With the binary counter in the "on" condition, carriage return may be read by the transmitter. When CR is read, diode 543, Fig. 24, conducts, over a circuit comprising a conductor 272, switch S8, and conductor 273, because Q133 of Fig. 18 conducts. This causes the anode of diode 539 to be at ground through 183K ohms resistance in resistors R23 and R24. At the next probe pulse for the flip-flop Q184, Q185, Fig. 24, which in time is at the end of the transmitter step pulse, this flip-flop sets, and the base of transistor Q171 changes from ground to −20 v. This causes the emitter of Q171 to be at −20 v. The cathodes of diodes 471, 474, 477, 489, Fig. 22, and 483 and 486, Fig. 23, connected over a conductor 245 to the emitter of Q171, then conduct, preventing tubes VT3 through VT8, which control reperforator operation, from firing. The negative potential that appears on the emitter of transistor Q171 is also gated into the base of transistor Q170 of Fig. 24 and causes the latter transistor to conduct. When it conducts to ground, it applies ground, over conductors 242 and 242', through separate 47K ohm resistors at the anode of diode 382 in stage (5) and the corresponding diodes in stages (1), (2), (3) and (4) of the initial storage of Fig. 16. This will allow the selection that is in the transmitter to be gated into the initial storage flip-flops.

At the time the ground pedestal is set up by transistor Q170 of Fig. 24, the transmitter pins are about to go to a spacing condition. Therefore, the last selection from the reperforator is still allowed to set the initial storage flip-flops. These flip-flops will be reset before a marking pulse appears in the next character in the transmitter. The next character is then placed into the initial storage flip-flops from the transmitter. This occurred after the read-back pins of the reperforator had inserted the character associated with the carriage return punch cycle into the initial storage flip-flops and these flip-flops had been reset.

At the end of the next Operate pulse, the transmitter is stepped and flip-flop Q184, Q185, Fig. 24, is reset. When Q184, Q185 resets, a positive pulse is derived from the collector of transistor Q184 and used to set the flip-flop Q186, Q187. With the latter flip-flop set, transistor Q171 remains in a conducting state because diode 557 no longer conducts. This keeps the reperforator from operating and also allows the next character in the transmitter to be placed into the initial storage flip-flops. The potential of the collector of transistor Q186 is then —20 volts. This —20 volt potential, over conductor 243, the switch S8 of Fig. 23, and conductor 244, is seen at the anode of diode 427, Fig. 19, through a 22K ohm resistor R20. This negative potential will prevent the output of the No. 3 buffer storage flip-flop of Fig. 15 from affecting the 5th stage V of the eight-stage binary counter. During this cycle the second check character that is being read by the transmitter is inserted into the initial storage flip-flops. The five buffer storage flip-flops Q113, Q114 to Q121, Q122 are also reset, and their outputs are gated into the first four stages of the eight-stage binary counter. This character that is going into the first four stages of the counter is the first check character.

At the end of the next Operate pulse, flip-flop Q184, Q185, Fig. 24, sets because diode 544 conducts to ground and causes the anode of diode 539 to be at ground through resistors R23, R24. With flip-flops Q184, Q185 and Q186, Q187 in the set condition, transistor Q171 ceases to conduct. This places its emitter at ground and causes the output of the collector of transistor Q170 to be at a —20 volt potential. When the emitter of transistor Q171 returned to ground, it removed the clamping circuit over conductor 245 that held the reperforator in a stop position. With the collector of transistor Q170 returned to a —20 volt potential, the status of the character in the transmitter is no longer gated into the initial storage flip-flops because a negative pedestal, over conductors 242 and 242', exists on the transmitter pin inputs. During this cycle, the selection in the initial storage flip-flops of Fig. 16, which is the second check character, is transferred to the buffer storage flip-flops of Figs. 14 and 15 and is then read out one at a time into the second four stages V to VIII of the eight-stage binary counter. This is accomplished by causing the anodes of the diodes 428 to 430, Fig. 19, and 431, Fig. 20, to be at ground potential through separate 22K ohm resistors R21 and by causing the anodes of diodes 423 to 426, Fig. 18 and 19, to be —20 v. through separate 22K ohm resistors R20. At the end of the next operate pulse, flip-flop Q184, Q185, Fig. 24 is reset, which in turn causes flip-flop Q186, Q187 to be reset, and this brings the conditions of these flip-flops and their respective gates to their normal state.

Five character cycles after the carriage return is read by the transmitter this same carriage return is seen by the read-back pins of the reperforator. When this carriage return is thus read and placed into the initial storage flip-flops, transistor Q207, Fig. 23, conducts and its emitter goes to ground. This causes ground through conductor 274, the switch S8 and conductor 275, and a 33K ohm resistor to appear at the anode of diode 516.

At the next probe pulse, which is generated by the 6th pulse contact 385, Fig. 17, of the reperforator, flip-flop Q182, Q183, Fig. 23, switches. This causes diode 546, Fig. 24, associated with the one-shot multivibrator Q188, Q189, which is used to determine the sum of the eight-stage binary counter at the end of a block of data, to stop conducting. The buffer storage flip-flops are reset when pulses 1, 2, 3, 4 and 5 are generated by the pulse generator. This now causes the sum in the eight-stage binary counter to be equal to the check character plus the block of information associated with these check characters. If each stage of the counter is in the set condition, i.e., to the all "1" stage, none of the diodes 463 to 470, Figs. 18 to 20, will conduct because they are associated with the set side of the flip-flop.

At the next compare pulse, which is generated from the pulse generator after pulses 1 to 5 have been generated, negative potential exists at the input circuit of transistor Q188 of Fig. 24. This causes the one-shot multivibrator Q188, Q189 to be triggered off. Transistor Q189, which was normally conducting, is now in the non-conducting state or at —20 v. When the one-shot multivibrator cycle is terminated, transistor Q189 returns to conduction, which causes it collector to change from —20 v. potential to ground. This positive change is coupled through a capacitor into the grid of thyratron VT10, causing the thyratron to conduct. This thyratron operates, over conductor 75, the "correct" marking mechanism of the tape marking device of Figs. 25 and 26. When flip-flop Q182, Q183 of Fig. 23 resets at the next probe pulse, over conductor 271, from the reperforator, the collector of transistor Q182 rises in potential from —20 v. to ground. This causes a positve pulse to be derived and prevents diode 548, Fig. 24, from conducting. However, diode 550 is conducting because the one-shot multivibrator was triggered off and the collector of Q189 is now at a —20 v. potential. Diode 550 conducting to minus potential causes the grid of thyratron VT9 which operates, over conductor 74, the "incorrect" marking mechanism of the tape marking device, to remain at a negative potential.

If the sum of the check characters plus the block of information associated with these check characters does not cause the eight-stage binary counter to be in an all "1" condition, one or more of the diodes 463 to 470 of Figs. 18 to 20 will conduct. This will prevent the one-shot multivibrator from being triggered off, and when flip-flop Q182, Q183 of Fig. 23 resets, thyratron VT9 which operates the "incorrect" mechanism of the tape marking device will conduct. Diode 549 of Fig. 24 will also conduct and, if the stop or nonstop on error switch S2, Fig. 22, is thrown to the stop position (terminal 1 connected to terminal 2) flip-flop Q172, Q173 of Fig. 21 will switch. When diode 549, Fig. 24, conducts, thyratron VT11 fires and operates the buzzer, Fig. 22. The switching of flip-flop Q172, Q173 causes the whole system to stop. Upon depression of the reset switch S6, flip-flop Q172, Q173 resets, and the buzzer is disengaged. The whole checking cycle is then restarted.

*Checking without deletion of check characters*

By throwing the selector switch S8 of Fig. 23 from delete (D) to nondelete (ND) position, the carriage return reading circuit which is associated with the transmitter is not allowed to affect the control circuits. Now, when the carriage return is read by the read-back pins of the reperforator, flip-flop Q178, Q179 of Fig. 22 and flip-flop Q180, Q181 of Fig. 23 perform the function of transferring the check characters (which will first go into the initial storage flip-flops) from the read-back pins into the buffer storage flip-flops and then into the appropriate stages of the eight-stage binary counter. If the sum of the block of data plus its check characters adds up to an all "1" condition, the one-shot multivibrator composed of transistors Q188, Q189, Fig. 24, is activated. If the sum is not that of an all "1" condition the one-shot multivibrator is not activated, which indicates an incorrect block. The procedure of firing the tube VT9 associated with the "incorrect" marking mechanism of the tape marking device of Figs. 25 and 26, of operating the buzzer of Fig. 22, and of stopping the system is then followed.

*Long block timer.*—The "long block" timer circuit associated with the receiving end of the system is seen in Figs. 20, 21 and 24, and is the same as the one employed at the sending end of the system, and shown in Figs. 9, 10, 12 and 13 of the drawings and described hereinbefore in detail. Its inputs, however, are derived from circuits which are associated only with the receiving end equipment; its function is the same. The one-shot multivibrator composed of transistors Q63, Q64, Q65 and Q66, Fig. 24, is timed for about 4.5 seconds, as in the case of the transmitting end, so that the circuit times each block of data to guarantee the reading of a carriage return within a preset time.

*Counter to prohibit reading of carriage return at the transmitter.*—A three-stage counter compromised of flip-flops Q190, Q191, Q192, Q193 and Q194, Q195, Fig. 14, is employed to prevent the reading of a carriage return a certain number of character cycles after a carriage return has been read. This counter is used only when checking is being done with deletion of check characters (switch S8 of Fig. 23 thrown downward to position D). When flip-flop Q184, Q185 of Fig. 24 switches, a ground, over conductor 261, appears at the anode of diode 567, Fig. 14. This causes the anode of diode 564 of flip-flop Q190, Q191 to be at ground through 147K ohms in resistances R26, R27, and at the next probe pulse which is generated from the 6th pulse contact 385 on the reperforator, flip-flop Q190, Q191 switches. The fact that this flip-flop switches causes it to go from its home position and it will then cause the three-stage counter to count until seven probe pulses from contacts 385 of the reperforator have been counted. However, at the sixth probe pulse, flip-flop Q182, Q183 of Fig. 23 switches. This causes the collector of transistor Q183 to go from −20 v. to ground, and this positive change is coupled, over conductor 260, into the anodes of diodes 576, 577 and 578, Fig. 14. This resets this three-stage counter to its one count, and the counter will then proceed to count until it counts six more probe pulses from the contacts 385 of the reperforator for a total count of twelve. While this counter is running, transistor Q204 is conducting, causing its emitter to be at ground which in turn causes the anode of diode 579 of Fig. 18 to be at ground potential. The anode of this diode at ground prevents transistor Q133, Fig. 18, from conducting, thereby preventing the reading of the carriage return by the transmitter Xtr. The prohibiting of the reading of the carriage return is necessitated because of the five-character delay associated with the punching of a character and the reading of that character by the reperforator. It is also necessitated because four control characters have to be read in order to switch the eight-stage binary counter off. With the use of the three-stage counter it is necessary that the minimum block length be twelve characters.

*Tape marker device*

Figs. 25 and 26 show a form of tape marker device for marking each block or line of message characters with a distinctive mark following an error checking operation to indicate whether the block or line is correct or whether an error appeared. Such a marking device may, for example, comprise a frame member or plate 386 which carries a platen 387, and extending beneath the platen is a typewriter ribbon 388 characterized in that one half of the ribbon $388^1$ is impregnated with red ink and the other half of the ribbon $388^2$ is impregnated with black ink. The perforated tape $t^1$ or $t^3$ is stepped as it issues either from the dual pin transmitter of Fig. 1 or from the read-back reperforator of Fig. 2, as the case may be, in the direction of the arrow seen in Fig. 25, transversely across the plate 386 and beneath the typewriter ribbon 388. The plate 386 has an aperture 399 therein through which either of two print hammers 396 may strike against a portion of the tape and cause the ribbon to produce a short colored line or mark on the tape. Each print hammer is carried by an arm 395 secured to an armature 393, which armature is normally held in retracted position against a stop pin 400 by the coil spring 394.

The circuit incoming over either conductor 74 or 75 (depending upon whether an error was or was not present) passes through normally closed contacts on a pair of leaf springs 390 and 391 and thence through the energizing coil of a magnet 392 or 392′ to positive battery. Thus, when the appropriate thyratron VT9 or VT10 of Fig. 12 or Fig. 24 is conducting, depending upon whether an error is present or not, one of the magnet coils 392 or 392′ is energized. The associated armature 393 is attracted and causes its print hammer 396 to strike against the proper half of the perforated tape and thereby cause the proper colored half of the ribbon to produce a mark on the tape. During the movement of the armature 393 the arm 395 engages the upper leaf spring 390 and deflects it to open the contact between these springs to deenergize the plate circuit of the associated thyratron and extinguish the same; the inertia of the members 393, 395 and 396, however, is sufficient to cause the mark to be applied to the tape notwithstanding the opening of the contact springs 390, 391 at or just prior to the time that the print hammer strikes the tape. The inking ribbon 388 is advanced in known manner across the perforated tape and around an idler roller 397 in order to successively present fresh ink areas to the print position. In the form illustrated in Figs. 25 and 26, the magnet 392 is in circuit with conductor 74 and when energized its print hammer causes a red mark to be applied to indicate an errored block or line of characters. If magnet 392′ is energized over conductor 75 its print hammer causes a black mark to be applied to indicate a non-errored block or line of characters.

For locally checking the new tape $t^1$ punched by the reperforator of Fig. 1, the Selector Switch is thrown upwardly to the "Check Tape" position, and the tape is not passed through the transmitter distributor at this time but instead is fed through the dual pin transmitter, and as the tape issues from the transmitter it is stepped directly through the tape marker device. During this operation the reperforator is not working. If the new tape is found to be free from error, it is then passed through the transmitter distributor for transmission of the signals over the outgoing line L. In the receiving end of the system, and as seen in Fig. 2, the tape $t^3$ as it issues from the read-back reperforator is stepped directly through the tape marker device.

While the invention has been described with reference to particular embodiments thereof and in connection with particular uses, it is not to be regarded as limited thereto since various modifications, substitutions, and uses thereof will occur to those skilled in the art without departing from the spirit and scope of the invention as set forth in the appended claims. For brevity in the claims, the term "control form" is employed to define a perforated tape or equivalent signal bearing medium embodying signal conditions representing coded telegraph pulses; the term "transmitter" defines a tape transmitter or equivalent means for sensing such a control form; the term "recorder" defines a tape reperforator or equivalent control-form reproducing device; and the term "read-back recorder" defines a control-form reproducing device which also reads back the signals applied by it to the control form.

What is claimed is:

1. A system for detecting errors occurring in pulse code telegraph transmission and in which the marking and spacing code pulses which comprise each message character respectively occupy different signal code levels to which different numerical weights respectively are assigned for error checking purposes, comprising a first control form containing signal conditions representing the code pulses comprising the characters of a message and a recorder for producing a second control form containing signal conditions representing the code pulses comprising the characters of said message, a digital counter having stages of different denominational orders, a transmitter having a first means for sensing said first control form and sending to the recorder signals representing said message characters, said transmitter having a second means for sensing said first control form and applying to said counter digit signals representing the different weights assigned to the code pulses of one kind for each character until a selected group of said message characters have been sensed, said first control form including at least one control character for indicating the end of each said selected group of message characters, means including said counter operative after said control character has been sensed for producing checking signals representative of the resultant numerical sum obtained by the counter and for transmitting the checking signals to said recorder to cause the recorder to apply to said second control form signal conditions representing said checking signals and following said message characters previously applied by said recorder to the second control form.

2. A system according to claim 1, in which said first control form contains other characters including address characters in advance of the beginning of said message characters, means for causing said first named transmitter to send said other advance characters to said recorder, and means for preventing said transmitter from sending said advance characters to said counter to thereby prevent checking signals from appearing in the address portion of the message.

3. A system according to claim 1, in which said first control form contains a predetermined sequence of particular characters to indicate that the characters immediately following are message characters to be included in the error checking operations, means including a character reading matrix and a sequential character reading network for recognizing said predetermined sequence when the characters are sensed by said first named transmitter, and means controlled by said network for causing the following message characters in said first control form to be included in said error checking operations.

4. A system according to claim 1, in which said first control form contains at least one control character to initiate the generation of said checking signals at the end of a selected group of the message characters, means operative when said control character is sensed by said first named transmitter for causing the checking signals produced by the counter to be transmitted to said recorder and applied to said second control form, and means for stopping said transmitter until the recorder has received said checking signals.

5. A system according to claim 3, in which said first control form contains a predetermined sequence of particular characters to indicate the termination of the message, and means including said character reading matrix and sequential character reading network for recognizing said termination sequence and means controlled thereby for turning off the counter and transmitting said termination sequence only to said recorder.

6. A system according to claim 4, including means operative when said checking signals have been produced by the counter for restoring the counter to its initial starting condition.

7. A system according to claim 1 in which said first control form contains at least one said control character following a selected group of message characters to initiate the production of error checking signals, and including a timer circuit operative to give an alarm in the event that said control character does not appear within a predetermined time interval after the beginning of said selected group of the message characters.

8. In a system according to claim 1, means for checking said second control form for errors which comprises said first transmitter for sensing said second control form and applying to the counter the digit signals representing the selected group of message characters, means operative when said control character is sensed by said first transmitter to initiate a checking operation for causing said transmitter to apply to the counter the checking signals present in said second control form, means for ascertaining the status of the stages of the counter and means controlled in accordance therewith for indicating whether an error is or not present in the selected group of message characters thus checked.

9. A system according to claim 8, including means for applying to the second control form a mark for indicating whether an error is present in the said selected group of message characters.

10. A system according to claim 9, including switch means operative in one position to stop further checking operations when the presence of an error in said selected group of characters is indicated, and operative in another position to continue the checking operations until the entire message in said second control form has been sensed.

11. A system for detecting errors occurring in pulse code telegraph transmission from a sending station to a receiving station and in which the marking and spacing code pulses which comprise each message character respectively occupy different signal code levels to which different numerical weights respectively are assigned for error checking purposes, comprising a first control form at the sending station containing signal conditions representing the code pulses comprising each character of a message, a digital counter at each of said stations having stages of different denominational orders, means at the sending station for sensing said control form and applying to the counter at the sending station digit signals representing the different weights assigned to the said code pulses of one kind until a selected group of said message characters have been sensed, said first control form including at least one control character for indicating the end of each said selected group of message characters, means at said sending station operative when said control character has been sensed for producing checking signals representative of the resultant numerical sum obtained by the counter at that station, recording means responsive to the signals sensed from said first control form and operative for producing a second control form containing signal conditions representing said message characters of the group followed by signal conditions representing said control character and checking signals, means controlled by said second control form for transmitting said message characters, control character, and checking signals to the receiving station, means including a transmitter at the receiving station for sensing the received signals, a read-back recorder for applying to a third control form signal conditions and having means for reading back the signals applied thereto, means for causing said last named transmitter to send to said read-back recorder the received message characters and control character, means for causing said recorder to read back from said third control form and apply to the counter at that station digit signals representing the different weights assigned to the code pulses of one kind of each of the message characters and said control character, means for causing said last named transmitter to send the checking signals only to said counter and for stopping said recorder while the checking signals are thus being applied to said counter, and error detecting means initiated by said control character when read by the read-back recorder and controlled jointly by the received checking signals and the resultant numerical sum obtained by said counter for producing an error signal in the event that an error occurred either in the preparation of said second control form at the transmitting station or during transmission or in the preparation of said third control form at the receiving station, said arrangement being operative in the absence of error to cause said third control form at the receiving station to conform to said first control form at the transmitting station.

12. A system according to claim 11, including switch means operative to cause said last named transmitter to send said checking signals to the read-back recorder instead of to the counter, and means for causing the checking signals read back by the recorder from the third control form to be sent to the counter, the arrangement being operative in the absence of error to cause said third control form at the receiving station to correspond to said second control form at the transmitting station.

13. A system according to claim 11, in which said second control form contains a predetermined sequence of particular characters to indicate that the characters immediately following are message characters to be included in the error checking operations at the receiving station, means at the receiving station including a character reading matrix and a sequential character reading network for recognizing said predetermined sequence when the characters are sensed by said read-back recorder, and means controlled by said network for causing the said following message characters to be included in said error checking operations.

14. A system according to claim 11, including means operative after said checking signals have been applied to the counter at the receiving station for restoring the counter to its initial starting condition.

15. A system according to claim 11 in which said second control form contains at least one said control character following a selected group of message characters to initiate an error checking cycle, said receiving station including a timer circuit operative to give an alarm in the event that said control character does not appear in the received signals within a predetermined time interval after the beginning of said selected group of message characters.

16. A system according to claim 11 including means for applying to said third control form a mark for indicating whether an error is present in the said selected group of message characters.

17. A system according to claim 13 in which said second control form contains a predetermined sequence of particular characters to indicate the termination of the message, and means at the receiving station including said character reading matrix and sequential character reading network for recognizing said termination sequence and means controlled thereby for turning off the counter and transmitting said termination sequence only to the read-back recorder.

18. A system according to claim 16, including said means operative in one position to stop further checking operations when the presence of an error in said selected group of characters is indicated, and operative in another position to continue the checking operation until the entire message in the said third control form has been sensed by said read-back recorder.

References Cited in the file of this patent

UNITED STATES PATENTS 2,281,745 Buckingham -------------- May 5, 1942

UNITED STATES PATENT OFFICE

CERTIFICATION OF CORRECTION

Patent No. 2,978,541 April 4, 1961

Robert Steeneck et al.

It is hereby certified that error appears in the above numbered patent requiring correction and that the said Letters Patent should read as corrected below.

Column 3, line 12, for "June 28, 1940" read -- June 28, 1949 --; column 9, line 71, for "light" read -- lights --; column 13, line 69, for "flip-flop" read -- flip-flops --; column 16, line 61, for "art" read -- are --; column 21, line 14, for "Ltrs of, Figs A," read -- Ltrs of Figs, A, --; column 27, line 8, after "code" strike out the comma.

Signed and sealed this 22nd day of August 1961.

(SEAL)
Attest:

ERNEST W. SWIDER
Attesting Officer

DAVID L. LADD
Commissioner of Patents